US012609129B2

(12) United States Patent
Le Roux et al.

(10) Patent No.: US 12,609,129 B2
(45) Date of Patent: Apr. 21, 2026

(54) AUDIO SIGNAL ENHANCEMENT WITH RECURSIVE RESTORATION EMPLOYING DETERMINISTIC DEGRADATION

(71) Applicant: Mitsubishi Electric Research Laboratories, Inc., Cambridge, MA (US)

(72) Inventors: Jonathan Le Roux, Arlington, MA (US); François G Germain, Quincy, MA (US); Gordon Wichern, Cambridge, MA (US); Hao Yen, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 217 days.

(21) Appl. No.: 18/492,377

(22) Filed: Oct. 23, 2023

(65) Prior Publication Data

US 2024/0170003 A1 May 23, 2024

Related U.S. Application Data

(60) Provisional application No. 63/382,013, filed on Nov. 2, 2022.

(51) Int. Cl.
*G10L 21/0308* (2013.01)
*G10L 25/30* (2013.01)

(52) U.S. Cl.
CPC .......... *G10L 21/0308* (2013.01); *G10L 25/30* (2013.01)

(58) Field of Classification Search
CPC ............................ G10L 21/0308; G10L 25/30
See application file for complete search history.

(56) References Cited

U.S. PATENT DOCUMENTS

| | | | | |
|---|---|---|---|---|
| 10,529,349 | B2 * | 1/2020 | Le Roux | G06N 3/08 |
| 11,924,367 | B1 * | 3/2024 | Valin | G10L 25/18 |
| 2017/0111856 | A1 * | 4/2017 | Rajendran | H04L 65/65 |
| 2019/0318725 | A1 * | 10/2019 | Le Roux | G10L 17/00 |
| 2019/0318754 | A1 * | 10/2019 | Le Roux | G10L 19/06 |
| 2019/0318755 | A1 * | 10/2019 | Tashev | G06N 3/045 |
| 2021/0312939 | A1 * | 10/2021 | Uhle | G10L 25/30 |
| 2021/0335341 | A1 * | 10/2021 | Kang | G06F 40/279 |
| 2022/0124433 | A1 * | 4/2022 | Kupryjanow | G10L 25/30 |
| 2023/0162758 | A1 * | 5/2023 | Borgstrom | G10L 25/24 704/200 |
| 2023/0306980 | A1 * | 9/2023 | Wang | G10L 21/02 |
| 2024/0331715 | A1 * | 10/2024 | Lee | G10L 21/0208 |

* cited by examiner

*Primary Examiner* — Michael N Opsasnick
(74) *Attorney, Agent, or Firm* — Gene Vinokur

(57) ABSTRACT

An audio processing system and method for processing audio is disclosed. The audio processing system collects an input audio signal indicative of degraded measurements of a target audio waveform. The input audio signal is restored with recursive restoration that recursively restores the input audio signal until a termination condition is met. A current iteration of the recursive restoration applies a restoration operator configured to restore a degraded audio signal conditioned on a current level of severity of degradation and degrades the degraded audio signal deterministically with a level of severity less than the current level of severity. A target signal estimate indicative of enhanced measurements of the audio waveform is generated as output.

20 Claims, 13 Drawing Sheets

AUDIO SIGNAL ENHANCEMENT WITH RECURSIVE RESTORATION EMPLOYING DETERMINISTIC DEGRADATION

TECHNICAL FIELD

The present disclosure generally relates to audio signal processing and more particularly to systems and methods for enhancement of audio signals using recursive diffusion restoration.

BACKGROUND

Typically, speech enhancement aims at improving intelligibility and quality of speech, for example, in scenarios where degradations in the quality of speech may be caused by non-stationary additive noise. In an example, the speech enhancement may be utilized in real-world applications in various contexts such as robust automatic speech recognition, speaker recognition, and assistive listening devices and so forth.

Conventional speech enhancement methods based on deep learning typically estimate a degraded-to-clean mapping through discriminative methods. These methods use regression techniques, taking input the features from the degraded speech and predicting the features from the clean speech, using regression techniques to train the system to match the clean speech features as target. For time-domain methods, this mapping can be performed directly from waveform to waveform, in which case the features are simply individual samples of audio signal. Moreover, time-frequency (T-F) domain methods may learn the mapping between Spectro-temporal features such as spectrogram, typically obtained via a short-time Fourier transform (STFT). Here too, some conventional approaches may predict clean speech features directly from degraded speech. However, other conventional techniques may instead predict a T-F mask to predict the clean speech features as the result of pointwise multiplication between the mask and the noisy speech features. Generally, time-domain methods may have the benefit of circumventing distortions caused by inaccurate phase estimation in T-F domain methods. However, the design of effective versions of time-domain methods is more challenging than for T-F methods.

In order to overcome the disadvantages in the degraded-to-clean mapping, some methods may utilize generative models rather than discriminative ones. The generative models may aim to learn distribution of clean speech as a prior for speech enhancement. Several traditional approaches utilize deep generative models for speech enhancement using generative adversarial networks (GANs), variational autoencoders (VAEs), and flow-based models. As a more recent example, a diffusion probabilistic model may show generation and enhancing capabilities in the field of computer vision.

The standard diffusion probabilistic model may include a diffusion (also known as forward) process and a reverse process. Typically, a core idea of diffusion process is to gradually convert clean input data into pure probabilistic noise (such as isotropic Gaussian distribution), by adding Gaussian noise to the original signal in multiple steps. In the reverse process, the diffusion probabilistic model learns to invert the diffusion process by estimating a probabilistic noise signal and using this predicted probabilistic noise signal to reconstruct the clean signal by subtracting it from the degraded input step by step. Recently, diffusion-based generative models have been introduced to the task of speech enhancement. For example, a standard diffusion framework and a supportive reverse process may be utilized to perform speech enhancement. Further, a conditional diffusion probabilistic model (CDiffuSE) is conventionally designed with a generalized forward and reverse process that may incorporate degraded audio spectrograms as conditioner into the diffusion process. Furthermore, a complex STFT-based diffusion procedure and a score-based diffusion model may be utilized for the speech enhancement. However, the discussed conventional methods for speech enhancement may only be able to deal with a limited type of degradations. Moreover, the conventional methods may have theoretical limitations that may lead to generation of a low-quality speech.

Accordingly, there is a need to overcome the above-mentioned problems. More specifically, there is a need to develop a system and a method for enhancement of the audio signals that are of high quality.

SUMMARY

It is an object of some embodiments to develop system and a method for enhancement of audio signals using recursive diffusion restoration. It is another object of some embodiments to perform training of a machine learning model to restore clean or enhanced audio signals from degraded audio signals. The enhanced audio signals may be extended for tasks, such as speech enhancement, automatic speech recognition, sound event detection and the like.

Some embodiments are based on an understanding that conventional diffusion-based models may display promising results in the generation of enhanced images by reducing background noise. However, the application of the diffusion-based models may remain suboptimal for at least some practical applications such as speech enhancement. It is an object of some embodiments to address this deficiency and provide a system and a method for diffusion-based restoration suitable for audio processing such as the speech enhancement applications.

Some embodiments are based on a recognition that the diffusion models may use stochastic principles by adding a randomly generated sample of Gaussian noise in loop, both at training and inference. While an assumption of the Gaussian distribution of noise is a natural choice as it may provide many theoretical guarantees, such an assumption may not be valid for removing interfering components found in a signal such as an audio waveform.

Some embodiments address this deficiency by replacing probabilistic signal degradation employing samples of additive noise coining from an isotropic Gaussian distribution with a deterministic degradation that may not have any assumption of a nature of the underlying signal. In such a manner, various embodiments may be enabled to adapt principles of the diffusion to challenging domain of audio processing.

Some embodiments are inspired, at least in part, by the principles of cold diffusion used for image generation. Cold diffusion is a technique that may be utilized in image processing, specifically in the context of using image denoising and deblurring operations to generate the images. In an embodiment, the cold diffusion may consider a broader family of deterministic degradation processes that may generalize the previous diffusion probabilistic framework, such as blur, masking, and downsampling.

Some embodiments are based on the realization proven by experiments and simulation, that the principles of cold diffusion may benefit the processing in the audio domain.

Accordingly, it is an object of some embodiments to disclose a system and a method for the audio signal enhancement with the recursive diffusion restoration employing deterministic degradation. To that end, the embodiments take in an input audio signal indicative of a mixture audio waveform deemed degraded, wherein the mixture audio waveform includes a target clean signal component degraded by an interference signal component. It restores the mixture audio waveform with an initialization step followed by a recursive restoration that recursively produces a current enhanced signal estimate until a termination condition is met. One embodiment discloses an audio processing system. The audio processing system comprises at least one processor and memory having instructions stored thereon that, when executed by the at least one processor, cause the audio processing system to collect an input audio signal indicative of degraded measurements of an audio waveform, wherein the input audio signal is considered as an initial degraded target signal estimate with an initial level of severity of degradation. The at least one processor may further cause the audio processing system to restore the input audio signal with an initialization step followed by a recursive restoration that recursively restores the input audio signal until a termination condition is met. The initialization step applies a restoration operator to the initial degraded target signal estimate conditioned on the initial level of severity of degradation to obtain a current target signal estimate. A current iteration of the recursive restoration degrades the current target signal estimate deterministically with a current level of severity less than the previous current level of severity and then applies the restoration operator conditioned on the current level of severity to obtain an updated current target signal estimate. The restoration operator is a neural network trained with machine learning to restore an input signal degraded from a clean input signal with different levels of severity. The at least one processor may further cause the audio processing system to output a current target signal estimate as a target signal estimate indicative of enhanced measurements of the audio waveform.

Starting with an audio signal degraded by an interference signal, the initialization step may receive this fully degraded audio signal as input audio signal and, concurrently, as initial degraded target signal estimate with an initial level of severity of degradation. At the end of the initialization step, the initial degraded target signal estimate is restored into a current target signal estimate. That step may be performed with the restoration operator configured to restore the input audio signal conditioned on the current initial level of severity of degradation. The restoration operator may be the neural network trained with machine learning to restore an input signal degraded from a clean target signal with different levels of severity. In some implementations, the restoration operator receives as an input a degraded target signal estimate and the level of severity of degradation. The level of severity represents an extent of degradation of the input from the clean target signal. In some implementations, the restoration operator is trained iteratively for different levels of severity.

Starting with a current target signal estimate produced as an output of the initialization step, each iteration of the recursive restoration may receive as an input an updated or enhanced current target signal estimate as an output of the previous iteration. At the end of the recursion, the degraded input audio signal is restored. Each iteration includes at least two steps. The first step aims to degrade the target signal estimate input to produce the current degraded target signal estimate but with a severity less than the severity of the previous current degraded target signal estimate, while the second step aims to restore the current degraded target signal estimate. The first step of the recursive restoration may be deterministic. The idea behind the first step is to degrade the target signal estimate during the first step to output a current degraded target signal estimate but with a severity that is less than in the previous current degraded target signal estimate. For the first iteration of the recursive restoration, the previous current degraded target signal estimate may correspond to the initial degraded target signal estimate used as input for the initialization step. For each of the subsequent iterations, the previous current degraded target signal estimate may correspond to the degraded target signal estimate produced as output of the first step of the iteration immediately preceding it.

The second step may be performed with the restoration operator configured to restore the current degraded target signal estimate conditioned on a current level of severity of degradation to produce a current target signal estimate. The restoration operator may be the neural network trained with machine learning to restore an input signal degraded from a clean target signal with different levels of severity. In some implementations, the restoration operator receives as an input the degraded target signal estimate and the level of severity of degradation. The level of severity represents an extent of degradation of the input from the clean target signal. In some implementations, the restoration operator is trained iteratively for different levels of severity. The current target signal estimate is the input to the next iteration. In such a manner, the recursive restoration restores the input audio signal iteratively, i.e., iteration by iteration.

In some embodiments, the current level of severity is monotonically related to an index of the current iteration in the recursive restoration.

In some embodiments, the index of the current iteration in the recursive restoration decreases over time with each iteration starting from an initial value of the index down to zero.

In some embodiments, the deterministic degradation of the current target signal estimate uses a weighted interpolation of any combination of two or more out of the current and previous current target signal estimates, and current and previous current degraded target signal estimates.

In some embodiments, the deterministic degradation of the current target signal estimate uses a weighted interpolation of the current target signal estimate and the current degraded target signal with weights determined based on a function of the index of the current iteration of the recursive restoration.

In some embodiments, the termination condition is based on a determination that a difference between the current target signal estimate and a previous current target signal estimate or a difference between the current target signal estimate and the initial degraded target is less than or equal to a threshold.

In some embodiments, the termination condition is based on a number of iterations of the recursive restoration.

In some embodiments, the recursive restoration further applies a degradation operator on the current target signal estimate to degrade the current target signal estimate deterministically.

In some embodiments, the degradation operator is configured to output a weighted interpolation between an input audio signal of the operator and an interference audio signal. In further embodiments, the weights are determined based on an input level of severity. In further embodiments, the degraded operator is configured to output a degraded target signal estimate having a level of severity less than the level of severity of the current degraded target signal estimate to degrade the current target signal estimate deterministically.

In some embodiments, the training of the restoration operator may include providing, as an input, an initial target signal estimate to a degradation operator to obtain a current degraded target signal estimate. The training may further include providing, as an input, the current degraded target signal estimate, to the restoration operator. The training may further include receiving, as an output, an updated current target signal estimate from the restoration operator.

In some embodiments, the training of the restoration operator may further include iteratively providing, as the input to the restoration operator, an updated degraded target signal estimate wherein each updated degraded target signal estimate was obtained by degrading the previous input target signal estimate to the restoration operator using the degradation operation with different levels of severity.

In some embodiments, the at least one processor further cause the audio processing system to determine a loss function based on calculation of a difference between the initial target signal taken as a ground truth signal and a current target signal estimate.

In some embodiments, the at least one processor may further cause the audio processing system to update the restoration operator as a function of the gradients of the loss function using a backpropagation algorithm for updating the restoration operator.

In some embodiments, the at least one processor may iteratively repeat the operations from the three previous paragraphs where each iteration of training may use a different input target audio signal and a different degradation operator until the determined loss function is less than or equal to a threshold.

In some embodiments, the at least on processor may perform the operations from the four previous paragraphs using a collection of input target audio signals and an associated collection of degradation operators while using the same restoration operator for each of the signals.

In some embodiments, the at least one processor further cause the audio processing system to determine a loss function based on the sum of a calculation of a difference between each of the input target audio signals taken as a ground truth signal and each of the corresponding current target signal estimates.

In some embodiments, the restoration operator is a convolution neural network comprising a feed forward and bidirectional convolution architecture with a diffusion-step embedding layer.

In some embodiments, the restoration operator is a deep complex convolution recurrent network with a diffusion-step embedding layer.

In some embodiments, the at least one processor causes the audio processing system to utilize the sequence of target signal estimates for speech enhancement.

In some embodiments, the at least one processor causes the audio processing system to utilize the sequence of target signal estimates for automatic speech recognition.

In some embodiments, the at least one processor causes the audio processing system to utilize the sequence of target signal estimates for sound event detection.

Another embodiment discloses a method for audio processing. The method may include collecting a degraded target signal indicative of degraded measurements of a target audio waveform. The degraded target signal may concurrently be indicative of a mixture audio waveform wherein the mixture audio waveform includes a target signal component and an interference signal component. The method may further cause the audio processing system to restore the degraded target signal with an initialization step followed by a recursive restoration that recursively restores the degraded target signal until a termination condition is met. The initialization step applies a restoration operator to the degraded target signal conditioned on the initial level of severity of degradation to obtain a current target signal estimate. A current iteration of the recursive restoration degrades the current target signal estimate deterministically with a current level of severity less than the previous current level of severity and applies the restoration operator conditioned on the current level of severity to obtain an updated target signal estimate. The restoration operator is a neural network trained with machine learning to restore an input signal degraded from a clean target signal with different levels of severity. The method may further include outputting a current target signal estimate indicative of enhanced measurements of the audio waveform.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

While most of the descriptions are made using speech as an audio waveform, the same methods can be applied to other types of audio signals.

System Overview

Figure 1:
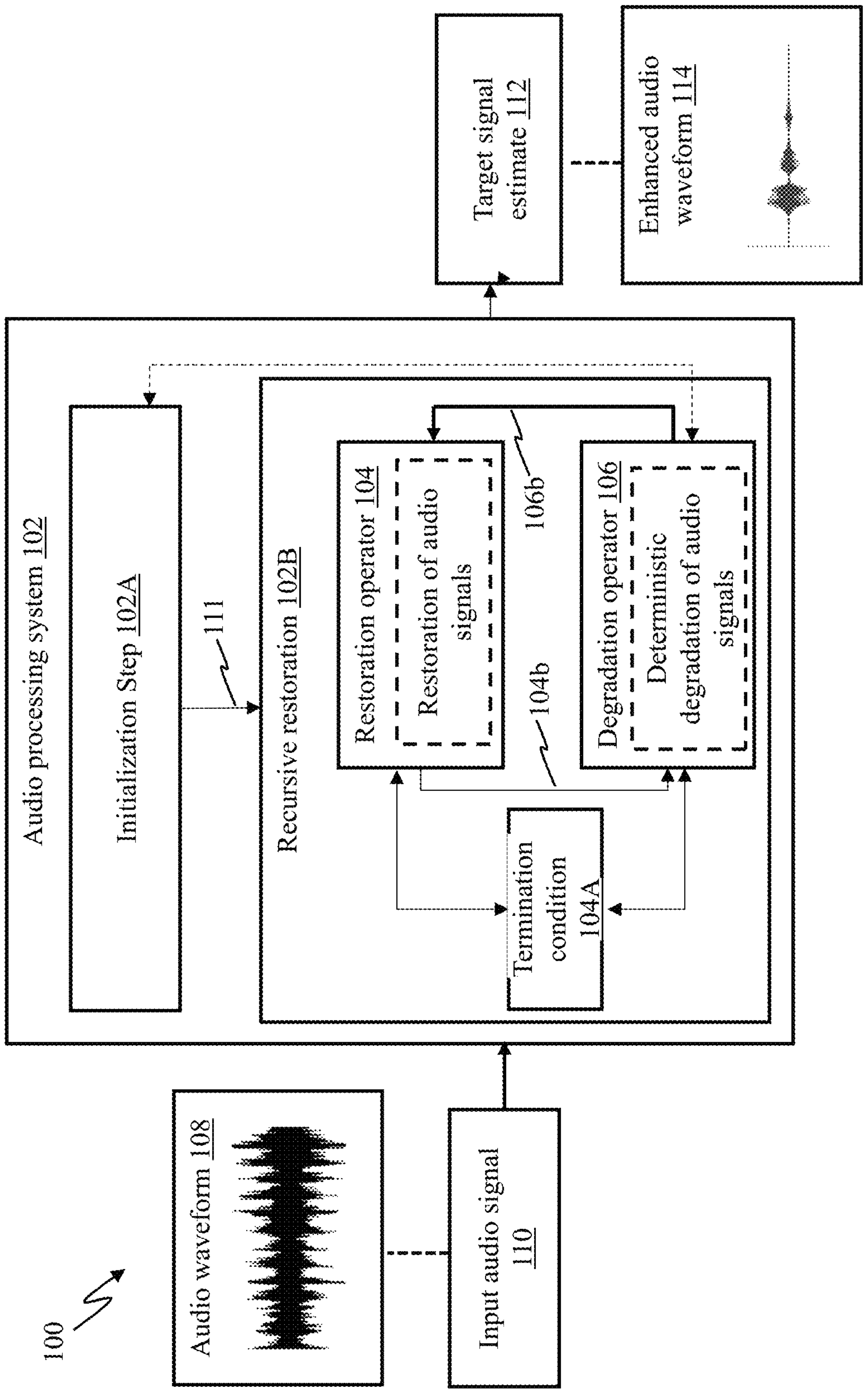
FIG. 1 illustrates a diagram depicting a network environment of an audio processing system for audio signal enhancement, according to embodiments of the present disclosure.

FIG. 1 illustrates a diagram 100 depicting a network environment of an audio processing system 102 for audio signals enhancement, according to embodiments of the present disclosure. The diagram 100 may include the audio processing system 102. The audio processing system 102 may be configured to perform an initialization step 102A. The audio processing system 102 may be configured to perform a recursive restoration 102B. The audio processing system 102 may further include a restoration operator 104 and a degradation operator 106. The audio processing system 102 may further check a termination condition 104A. The diagram 100 may further include an audio waveform 108, input audio signal 110, target signal estimate 112 and an enhanced audio waveform 114.

The audio processing system 102 may include suitable logic, circuitry, interfaces, and/or code that may be configured to receive an input audio signal indicative of degraded measurements of the audio waveform 108. The audio processing system 102 may process the input audio signal based on the initialization step 102A to output a first target signal estimate 111. The audio processing system 102 may further process the first target signal estimate 111 based on the recursive restoration 102B to output the enhanced audio waveform 114. In some embodiments, the audio processing system 102 may be further configured to train the restoration operator 104 to provide as an output, the target signal estimate 112 that may be utilized to generate the enhanced audio waveform 114. Examples of such audio processing system 102 may include, but not be limited to, a control system, a speaker, a server, a computing device, a mainframe machine, a computer workstation, a smartphone, a cellular phone, and a mobile phone.

The restoration operator 104 may be for example, a neural network model that may be trained to provide as the output, the target signal estimate 112. The restoration operator 104 may receive, as an input, an audio signal (such as the input audio signal 110), and provide, as an output, a target signal estimate, such that the target signal estimate includes less, or no degradation from interference audio as compared to the input. In an embodiment, the restoration operator 104 may be trained with machine learning to restore the input audio signal degraded from a clean target signal with different levels of severity. Examples of the restoration operator 104 may include, but are not limited to, a convolution neural network comprising a feed forward and bidirectional convolution architecture, and a deep complex convolution recurrent network. In some embodiments, the bidirectional convolution architecture is also known as a non-causal convolution architecture.

The degradation operator 106 may be configured to degrade an input target signal estimate with different levels of severity in each iteration of the recursive restoration operation 102B. For example, the degradation operator 106 may iteratively receive, as an input, a current target signal estimate 104A from the restoration operator 104 until the termination condition 104A is met. The degradation operator 106 may deterministically degrade the current target signal estimate 104B with a level of severity of degradation that may be less than an amount of degradation that is currently there in the current target signal estimate 104B. Such a process of using the restoration operator 104 and the degradation operator 106 may be performed iteratively. In an example, in order to degrade the input target signal estimate, the degradation operator 106 may introduce Gaussian probabilistic noise in the target signal estimate. In other examples, the degradation operator 106 may introduce non-Gaussian probabilistic noise in the target signal estimate. In some other examples, the degradation operator 106 may introduce other kinds of interference signal, such as street noise having honking sounds, vehicle sounds, human voices, and the like. The other kinds of interference signal may also include sounds such as beeps from elevators, opening and closing of doors, noise made by different animals, and the like.

The audio waveform 108 may correspond to an audio signal. In an example, the audio waveform 108 may be an analog signal. The audio signal may represent a sound using change in a level of electric voltage. In some cases, the audio waveform 108 may include interference signals. In an embodiment, the audio waveform 108 may be associated with different sources, such as a speech originating from subjects, such as humans and other living entities. In another embodiment, the audio waveform 108 may originate from electronic devices, such as computing devices, laptops, smartphones, television, and the like. For example, an output device, such as a loudspeaker or a headphone associated with the electronic devices may be configured to output the audio waveform 108.

The input audio signal 110 may include degraded measurements of the audio waveform 108. For example, the degraded measurements may need to be removed from the audio waveform 108 to generate the enhanced audio waveform 114. For example, the audio waveform 108 may be considered as a one-dimensional (1D) vector that stores numerical values associated therewith. The input audio signal 110 may be a two-dimensional (2D) plot depicting the numerical values as a function of time.

Furthermore, the target signal estimate 112 may correspond to a interference-free or enhanced input audio signal 110. The target signal estimate 112 may be obtained as the output of the restoration operator 104. The restoration operator 104 may take as the input, the input audio signal 110, to output the target signal estimate 112. The target signal estimate 112 may be processed to generate the enhanced audio waveform 114.

In an exemplary scenario, the audio waveform 108 may need to be enhanced or cleaned. The audio processing system 102 may be configured to collect the input audio signal 110 indicative of the degraded measurements of the audio waveform 108. For example, the audio processing system 102 may communicate with an electronic device such as the smartphone to receive the audio waveform 108. The audio processing system 102 may collect the input audio signal 110 of the audio waveform 108. Details of processing of the input audio signal 110 are further provided, for example, in FIG. 4.

The audio processing system 102 may further restore the target signal estimate 112 with the initialization step 102A that may be followed with the recursive restoration 102B until the termination condition 104A is met.

For example, in the initialization step 102A, the restoration operator 104 may be configured to restore a current degraded target signal estimate, conditioned on an initial current level of severity of degradation. The restoration operator 104 may output the first target signal estimate 111 as the current target signal estimate 104A in the initialization step 102A. To that end, an input audio mixture, also referred to equivalently as the input audio signal 110 may be received. The input audio signal is equated to an initial degraded target signal estimate with an initial level of severity. The initial target signal estimate is fed to the restoration operator in the recursive restoration operation with the initial level of severity as condition.

The termination condition 104A may further be checked, for example between the input audio signal 110 and a current target signal estimate 104B. If the termination condition 104A is not met, the audio processing system 102 may further restore a current degraded target signal estimate 106*a* with the recursive restoration operation 102B that may recursively restore the current degraded target signal estimate 106*b* until the termination condition 104A is met. For example, in a current iteration of the recursive restoration operation 102B, the degradation operator 106 may be configured to degrade the current target signal estimate (such as the target signal estimate 104B) deterministically with the level of severity less than the current level of severity, outputting a current degraded target signal estimate 106B. The restoration operator 104 may be configured to restore a current degraded target signal estimate 106B conditioned on a current level of severity of degradation. The recursive restoration 102B may include multiple iterations of degradation and subsequent restoration of the input audio signal until the target signal estimate 112 of the input audio signal 110 may be obtained. The target signal estimate 112 is an updated enhanced signal estimate of the input audio signal 110, which is obtained during the last iteration of the recursive restoration operation 102B. The audio processing system 102 may further output the sequence of target signal estimate 112 that may indicate that of enhanced measurements of the audio waveform 108 (such as the enhanced audio waveform 114). Details of the recursive restoration operation 102B and the output of the enhanced audio waveform 114 are further provided, for example, in FIG. 4 and FIG. 5.

Figure 2:
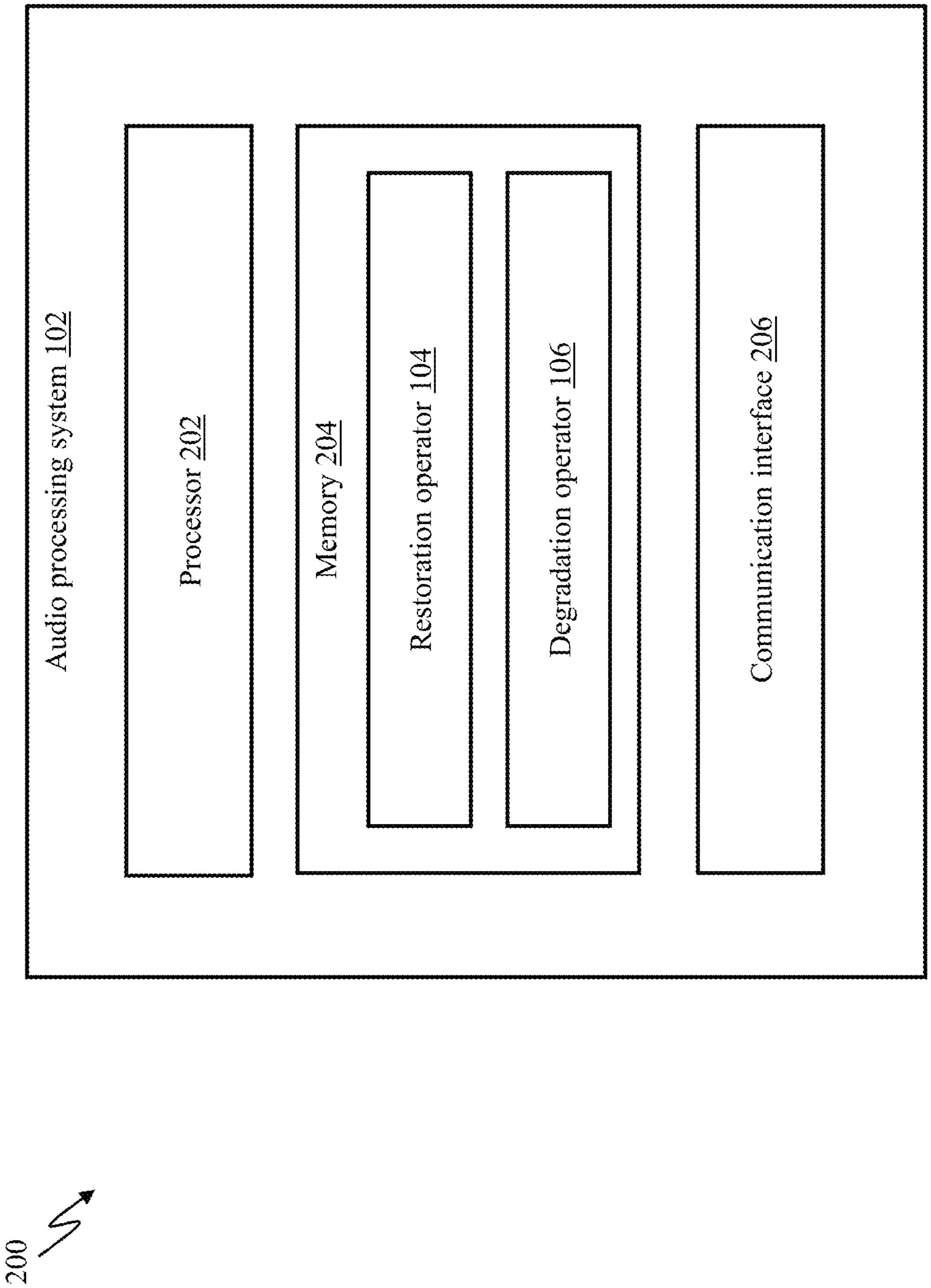
FIG. 2 illustrates a block diagram of the audio processing system, according to embodiments of the present disclosure.

FIG. 2 shows a block diagram 200 of the audio processing system 102, according to embodiments of the present disclosure. The block diagram 200 may include an at least one processor 202 (hereinafter referred as the processor 202), a memory 204 and a communication interface 206. The memory 204 may further include the restoration operator 104 and the degradation operator 106.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining and/or multithreading.

In some embodiments, the processor 202 may be configured to provide Internet-of-Things (IoT) related capabilities to users of the audio processing system 102. The IoT related capabilities may in turn be used to provide audio enhancement that may be utilized in applications such as real-time automatic speech recognition, sound event detection and the like. Additionally, or alternatively, the processor 202 may include one or more processors capable of processing large volumes of workloads and operations to provide support for big data analysis. In an example embodiment, the processor 202 may be in communication with the memory 204 via a bus for passing information among components coupled to the audio processing system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the apparatus to carry out various functions in accordance with an example embodiment of the present disclosure. For example, the memory 204 may be configured to buffer input data for processing by the processor 202.

As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202.

The communication interface 206 may comprise an input interface and output interface for supporting communications to and from the audio processing system 102 or any other component with which the audio processing system 102 may communicate. The communication interface 206 may be any means such as a device or circuitry embodied in either hardware or a combination of hardware and software that is configured to receive and/or transmit data to/from a communications device in communication with the audio processing system 102. In this regard, the communication interface 206 may include, for example, an antenna (or multiple antennae) and supporting hardware and/or software for enabling communications with a wireless communication network.

Additionally, or alternatively, the communication interface 206 may include the circuitry for interacting with the antenna(s) to cause transmission of signals via the antenna(s) or to manage receipt of signals received via the antenna(s). In some environments, the communication interface 206 may alternatively or additionally support wired communication. As such, for example, the communication interface 206 may include a communication modem and/or other hardware and/or software for supporting communication via cable, digital subscriber line (DSL), universal serial bus (USB) or other mechanisms. In some embodiments, the communication interface 206 may enable communication with a local processor or a cloud-based network to enable deep learning.

Figure 3:
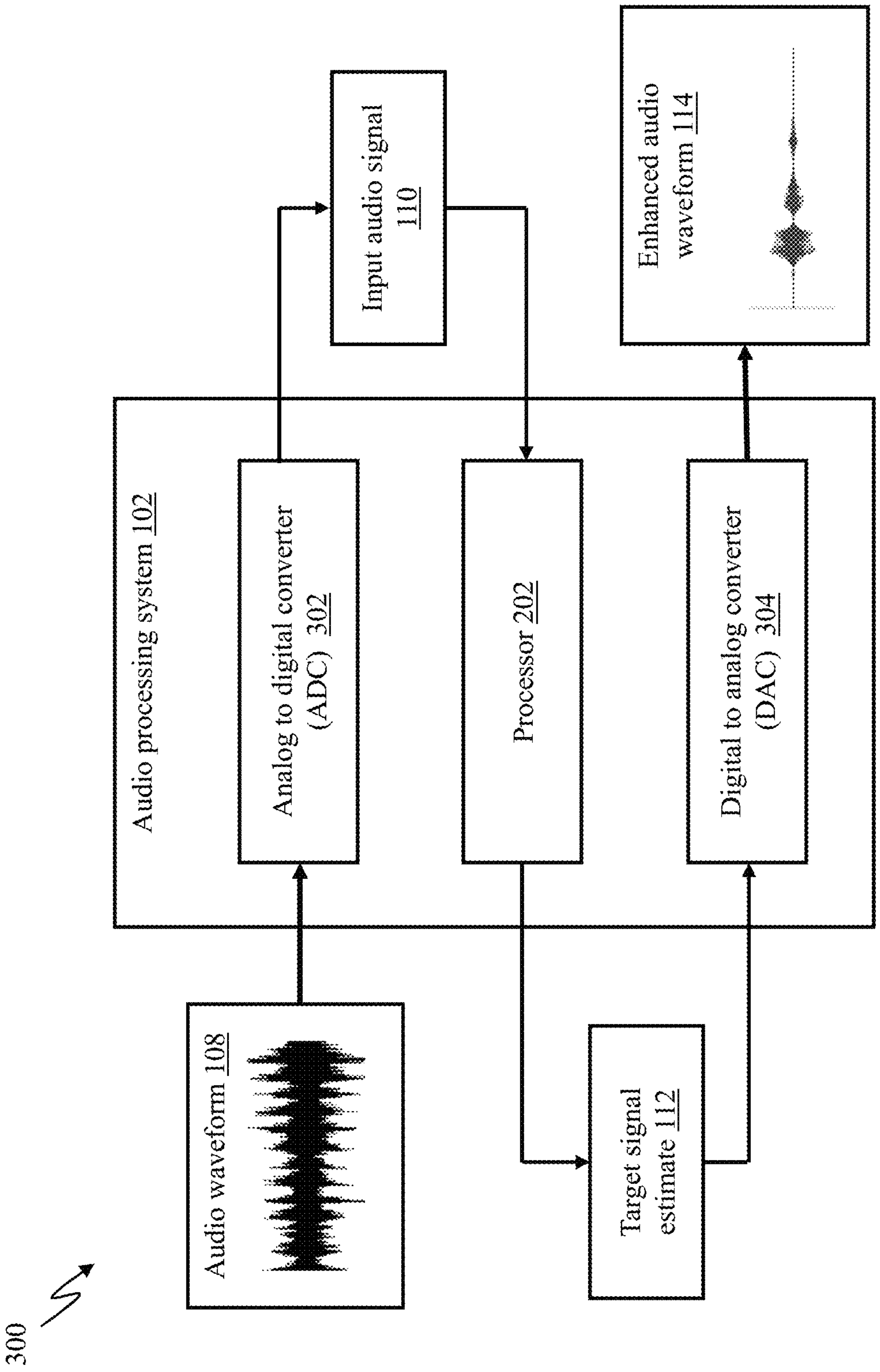
FIG. 3 illustrates a block diagram depicting processing of the of an audio waveform by the audio processing system, according to embodiments of the present disclosure.

FIG. 3 shows a block diagram 300 depicting processing of the audio waveform 108 by the audio processing system 102, according to embodiments of the present disclosure. The block diagram 300 may include an analog to digital converter (ADC) 302 and a digital to analog converter (DAC) 304. The block diagram 300 may further include the processor 202, the audio waveform 108, the input audio signal 110, the target signal estimate 112 and the enhanced audio waveform 114.

The ADC 302 may be an electronic circuit that may produce a digital output that is analogous to an analog input of the ADC 302. Effectively, the ADC 302 may measure an input voltage of the input signal and gives a binary output number proportional to a size of the input voltage. For example, the audio waveform 108 may be the analog signal that may be provided as the input to the ADC 302. The ADC 302 may process the voltage associated with each instance of the audio waveform 108 and may output the equivalent digital signal, such as the input audio signal 110.

The input audio signal 110 may be fed to the processor 202 that may include the restoration operator 104 and the degradation operator 106. The recursive restoration operation 102B may be applied to the input audio signal 110 to obtain the target signal estimate 112.

The DAC 304 may be an electronic circuit that may produce the analog output that is analogous to the digital input of the DAC 304. The DAC 304 may generate an analog signal based on processing of binary data of the digital input. For example, the target signal estimate 112 that may be in digital form, may be provided as the input to the DAC 304. The DAC 304 may process the target signal estimate 112 and may provide the enhanced audio waveform 114 as the output. The enhanced audio waveform 114 may be analog in nature. The enhanced audio waveform 114 may further be transmitted to the output devices, such as the loudspeaker or the headphones to output the enhanced audio waveform 114 to the users of the audio processing system 102.

Figure 4:
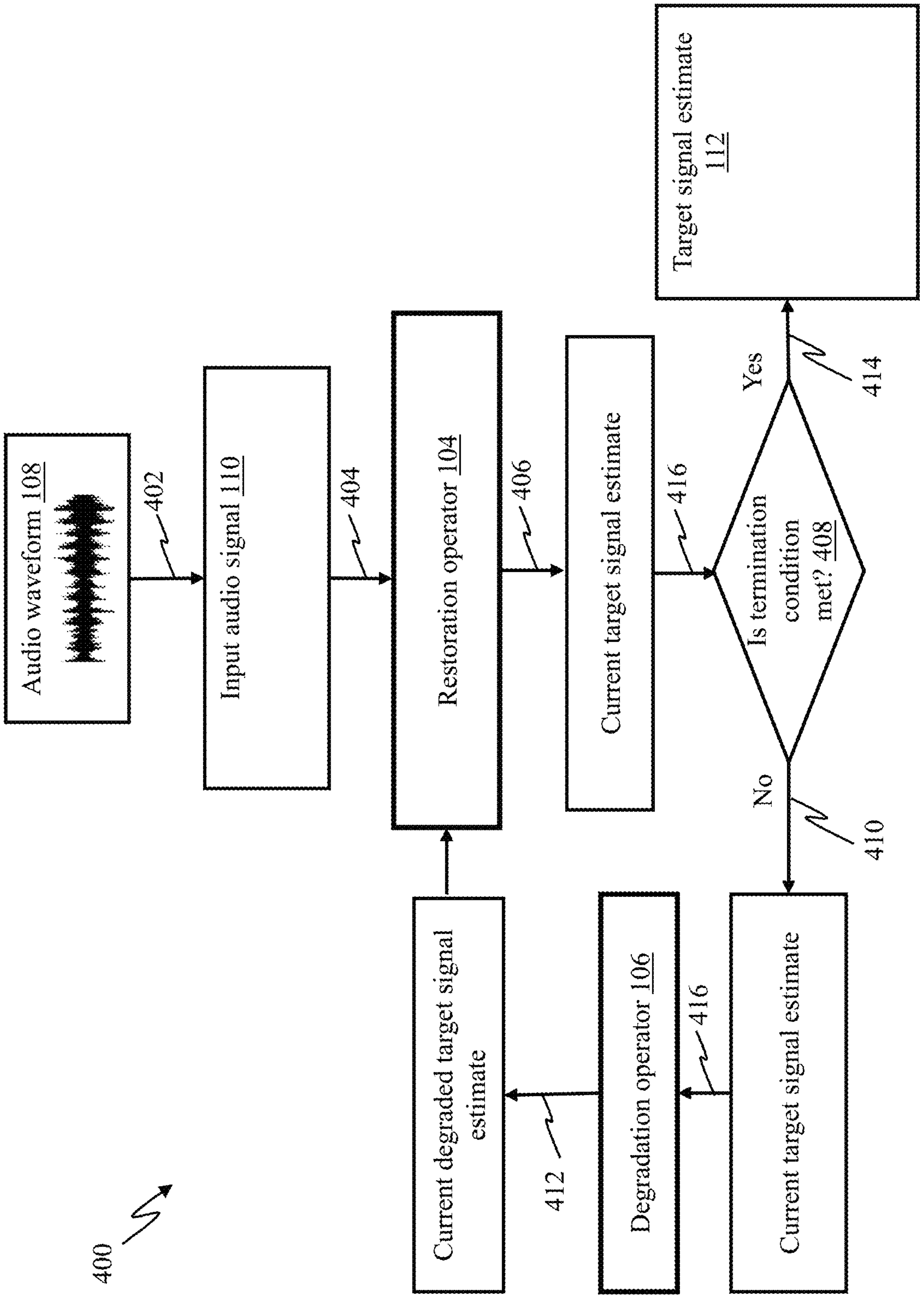
FIG. 4 illustrates a flowchart of a method depicting output of a target signal estimate indicative of enhanced measurements of the audio waveform, according to embodiments of the present disclosure.

FIG. 4 is a flowchart of a method 400 depicting output of the target signal estimate 112 indicative of enhanced measurement of the audio waveform 108, according to embodiments of the present disclosure. In various embodiments, the audio processing system 102 may perform one or more portions of the method 400 and may be implemented in, for instance, a chip set including the processor 202 and the memory 204 as shown in FIG. 2. As such, the audio processing system 102 may provide means for accomplishing various parts of the method 400, as well as means for accomplishing embodiments of other processes described herein. Although the method 400 is illustrated and described as a sequence of steps, it is contemplated that various embodiments of the method 400 may be performed in any order or combination and need not include all of the illustrated steps.

At step 402, the audio waveform 108 may be processed. In an embodiment, the processor 202 may receive the audio waveform 108 from the electronic device such as a smartphone. In another embodiment, the audio waveform 108 may be received from a user, in the form of a speech. For example, the audio processing system 102 may include one or more input devices, such as a microphone via which the audio waveform 108 from the user may be captured or received.

Furthermore, the input audio signal 110 indicative of the degraded measurements of the audio waveform 108 may be collected. For example, the received audio waveform 108 may include the interference signal that may need to be removed. In some embodiments, the processor 202 may collect the input audio signal 110 indicative of the degraded measurements from the electronic device. In one or more embodiments, the processor 202 may determine the degraded measurements from the received audio waveform 108.

In some embodiments, the input audio signal 110 may be preprocessed. In an example, one or more preprocessing techniques, such as resampling and normalization may be applied to the input audio signal 110 to enhance a quality and prepare the input audio signal 110 for analysis by the processor 202.

In an embodiment, a length of audio signal may vary depending on specific requirements of the processor 202, the restoration operator 104 (such as the neural network model) or characteristics of the audio waveform 108. In an example, the length may range from a few milliseconds to a few seconds.

At step 404, an audio signal may be input to the restoration operator 104. The restoration operator 104 may be trained to remove the degraded measurements from the audio signal and thus, restore the audio signal as a target signal estimate (such as a clean target signal).

When the step 404 is performed for the first time, that is for an input audio signal 110 that is received at the audio processing system 102 for the very first time instance, the step 404 becomes the initialization step 102A, and at current target signal estimate may be output, at step 406. The restoration operator 104 may output the current target signal estimate.

At step 408, the termination condition 104A may be checked. The processor 202 may be configured to check the termination condition 104A. In some embodiments, the termination condition 104A may be based on a current target signal estimate 416 of an initialization step 102A and an input audio signal of an initialization step 102A. Details of the execution of the termination condition 104A are further provided, for example, in FIG. 5.

At step 412, as part of the recursive restoration operation 102B, the degradation operator 106 may output a current degraded target signal estimate. The degradation operator 106 may degrade the current target signal estimate deterministically with a level of severity less than the current level of severity (i.e., the current level of severity of the degraded target signal estimate fed to the restoration operator 104). In some embodiments, the degradation operator 106 may be configured to output a weighted interpolation of any combination of two or more out of the current and previous current target signal estimates output by restoration operator 104, and current and previous current degraded target signal estimates output by degradation operator 106. The current degraded target signal estimate may further be enhanced by the restoration operator 104. In such a manner, the degradation in the input audio signal may be reduced or completely removed in the corresponding target signal estimates after multiple iterations.

At step 406, as part of the recursive restoration 102B, the current target signal estimate 416 may be output. The restoration operator 104 may output the target signal estimate. It may be noted that the processor 202 may perform multiple iterations in the recursive restoration operation 102B. In each iteration, the output of the restoration operator 104 may be degraded and again provided to the restoration operator 104 until the termination condition 104A is met.

At step 408, the termination condition 104A may be checked. The processor 202 may be configured to check the termination condition 104A. In some embodiments, the termination condition 104A may be based on a current target signal estimate of a current iteration of the recursive restoration operation 102B and a previous current target signal estimate of a previous iteration of the recursive restoration 102B or of the initialization step 102A or the input audio signal 110. In one or more embodiments, the termination condition 104A may be based on a number of the iterations of the recursive restoration operation 102B. Details of the execution of the termination condition 104A are further provided, for example, in FIG. 5.

At step 410, in case the termination condition 104A is not met, the target signal estimate of the current iteration, such as the current target signal estimate 416 may be provided as input to the degradation operator 106.

At step 414, in case the termination condition 104A is met, the target signal estimate of the initialization step (if the condition was met based on the output of the step) or of the latest iteration of the recursive restoration operation 102B may be output as the target signal estimate 112. Thus, in such a manner, the recursive restoration operation 102B may be applied on input audio signal 110, to obtain the target signal estimate 110 indicative of the enhanced measurements of the audio waveform 108 as the output.

Figure 5:
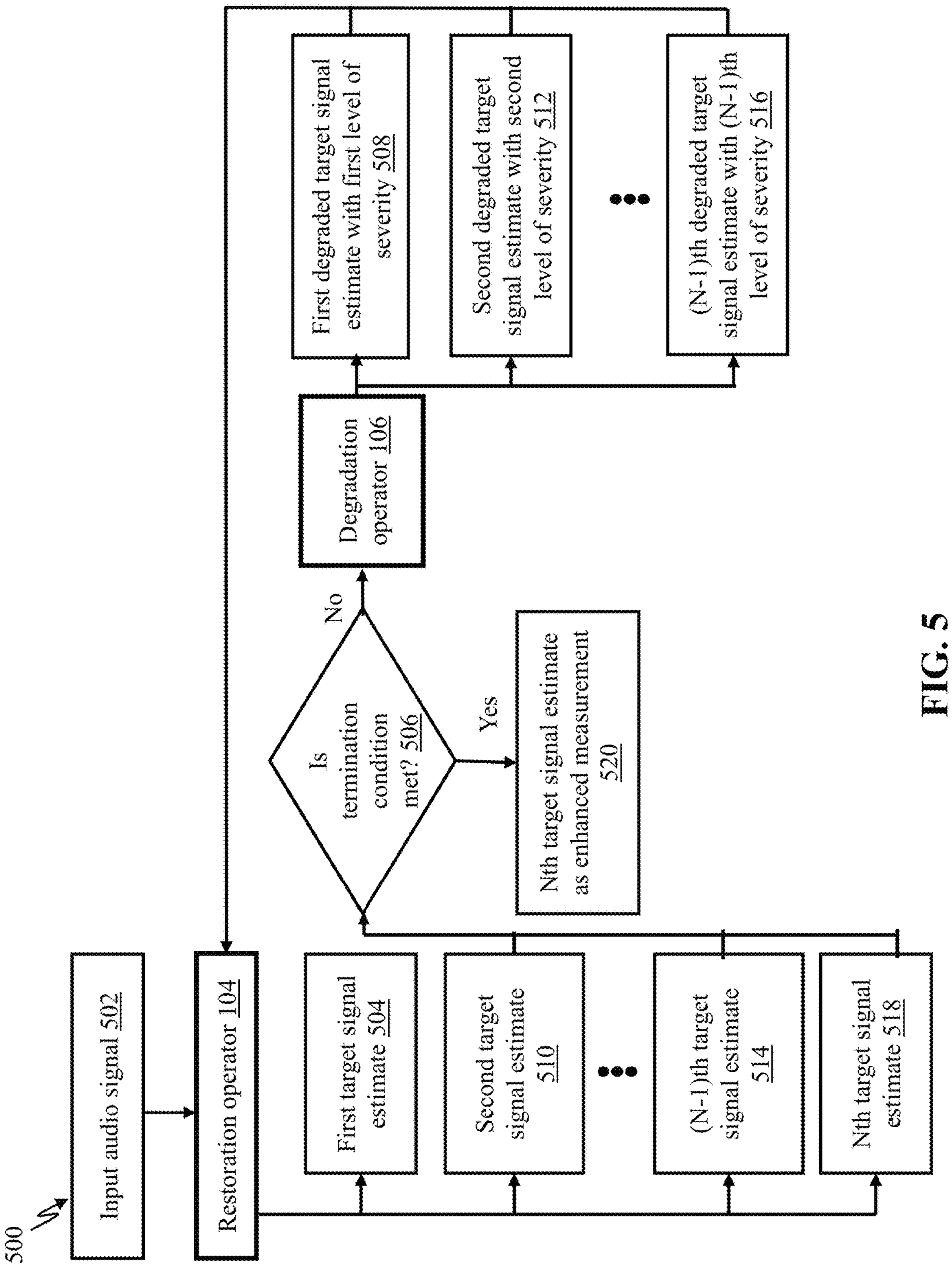
FIG. 5 is a flowchart of a method depicting recursive restoration of the signal of the audio waveform, according to some embodiments of the present disclosure.

FIG. 5 further explains the recursive restoration operation 102B of input audio signal 110 in detail.

FIG. 5 is a flowchart of a method 500 depicting the initialization step 102A and the recursive restoration 102B of the input audio signal 110 of the audio waveform 108, according to some embodiments of the present disclosure. In various embodiments, the audio processing system 102 may perform one or more portions of the method 500 and may be implemented in, for instance, a chip set including the processor 202 and the memory 204 as shown in FIG. 2. As such, the audio processing system 102 may provide means for accomplishing various parts of the method 500, as well as means for accomplishing embodiments of other processes described herein. Although the method 500 is illustrated and described as a sequence of steps, it is contemplated that various embodiments of the method 500 may be performed in any order or combination and need not include all of the illustrated steps.

In an embodiment, a degraded speech is taken as the audio waveform 108 that may be represented as:

$$y=x_0+n \tag{1}$$

where y is the degraded speech waveform, $x_0$ is a clean target speech waveform that needs to be recovered, and n is the interference audio waveform degrading the speech waveform measurements.

It may be noted that compared to prior methods, the proposed method in the present disclosure differs in a manner that the degraded target signal estimate also includes information of the actual clean target signal, i.e., the degradation operator 106 may add the out of domain interference audio signal to the clean target signal.

At step 502, the initialization step may be performed, for example, a first degraded target signal estimate may be input to the restoration operator 104. For example, the first target signal estimate may be the degraded speech described in equation 1.

At step 504, a first target signal estimate may be output by the restoration operator 104 in the initialization step 102A. In some embodiments, a portion of the degradation measurement "n" may be removed by the restoration operator 104 in the initialization step, however, some degradation may still be remaining in the first target signal estimate. The first target signal estimate may further be provided as the input, to the degradation operator 106.

At step 508, a first degraded target signal estimate may be obtained in a first iteration of the recursive restoration 102B.

The degradation operator 106 may provide as the output, the first degraded target signal estimate with a first level of severity. The first degraded target signal estimate may be described as follows:

$$x_t = D_{x_T}(\hat{x}_0, t) = \sqrt{\alpha_t}\,\hat{x}_0 + \sqrt{1-\alpha_t}\,x_T \quad (2)$$

where $x_t$ is the current (e.g., the first) degraded target signal estimate, D is the degradation operator 106, "t" is a current level of severity, $a_t$ is an interpolation weight parameter for the degradation of the current target signal estimate, $$\hat{x}_0$$

is the current (e.g., the first) target signal estimate and $x_T$ is the degraded speech of equation 1 also represented by "y".

In some embodiments, the current level of severity may be monotonically related to an index of the current iteration in the recursive restoration 102B. The index of the current iteration may be, for example, equivalent to a number of a total number of the iterations defined as "T". Thus, as the index of the current iteration decreases in the recursive restoration operation 102B, the current level of severity may be decreased. In an exemplary scenario, the total number of the iterations may be 50. As the number of the 50 iterations decreases, the level of severity may decrease. Thus, the first level of severity of the first degraded target signal estimate may be less than the level of severity of the input audio signal.

In some embodiments, the index of the current iteration in the recursive restoration operation 102B may decrease over time with each iteration starting from an initial value of the index down to zero. In an exemplary scenario, the total number of the iterations may be 50. In such a case, in the first iteration, the index may be 49. In a second iteration, the index may be 48. In a third iteration, the index may be 47, and so forth. Thus, in the last iteration, the index may be zero.

Moreover, the first degraded target signal estimate or the degraded audio signal $x_t$ may be the deterministic interpolation between $$\hat{x}_0$$

and $x_T$ with interpolation weights defined by $a_t$, with $a_t$ starting from $a_0=1$ and gradually decreased to $a_T=0$, where T is the terminal level of degradation severity (e.g., the total number of degradation steps).

At step 506, the termination condition 104A may be checked. The processor 202 may be configured to check if the termination condition 104A is met. In some embodiments, the termination condition 104A may be based on the number of iterations of the recursive restoration operation 102B. In an exemplary scenario, the total number of the iterations may be 50. In such a case, if 50 number of iterations have been completed in the recursive restoration 102B, the recursive restoration operation 102B may be stopped. Therefore, in case the termination condition 104A is met, the output of the $50^{th}$ iteration (i.e., the iteration which output $x_0$ with index 0) may be output as the target signal estimate.

In some embodiments, the termination condition 104A may be based on a determination that a difference between the current target signal estimate and the previous current target signal estimate, or the input audio signal in case this is the current target signal estimate is the first target signal estimate output from the initialization step, is less than or equal to a threshold. For example, the processor 202 may determine the difference between the amount of degradation in the first target signal estimate (such as the previous current target signal estimate) and the second target signal estimate (such as the current target signal estimate). In case the termination condition 104A is met, i.e., the determined difference is less than the threshold, the recursive restoration operation 102B may be stopped, and the current target signal estimate may be output as the target signal estimate.

At step 510, the first degraded target signal estimate may further be provided to the restoration operator 104 to complete the first iteration of the recursive restoration operation 102B. The restoration operator 104 may output a second target signal estimate. The restoration operator 104 may remove some degradation from the first degraded target signal estimate to output the second target signal estimate. It may be noted that the level of severity of the second target signal estimate may be less than the level of severity of the first target signal estimate.

Given the degraded audio signal $x_t$ at the current level of severity "t", the current (e.g., second) target signal estimate $$\hat{x}_0$$

may be obtained from the restoration model 104, also depicted as $R_\theta$ (such as the restoration model 104 is the neural network model having coefficients θ). In some embodiments, the deterministic degradation of the target signal estimate may utilize the weighted interpolation of any combination of two or more out of the current and previous current target signal estimates output by restoration operator 104, and current and previous current degraded target signal estimates output by degradation operator 106, either during the initialization step 102A or the recursive restoration 102B.

At step 512, a second degraded target signal estimate may be obtained. The second target signal estimate may be input to the degradation operator 106 to obtain, as the output, the second degraded target signal estimate. The level of severity (such as the second level of severity) "s" introduced in the second target signal estimate may be less than the level of severity "t" introduced in the first target signal estimate.

In some embodiments, the deterministic degradation of the current target signal estimate may use a weighted interpolation of the current target signal estimate and the input audio signal. For example, it may correspond to the degradation described in Equation (2) updating $\hat{x}_0$ as the current target signal estimate so that the degradation interpolates linearly between the current target signal estimate $$\hat{x}_0$$

(for a level of severity set to 0) and $x_T$ (for a level of severity set to "T").

In some other embodiments, the deterministic degradation of the target signal estimate may use a weighted interpolation of the current target signal estimate $\hat{x}_0$ and the current degraded target signal estimate $x_t$ with a weight determined based on a function of the index of the current iteration of the recursive restoration 102B. For example, the degradation anchored around $x_t$ may be utilized for step 512, i.e., the degradation that interpolates linearly between the audio signals $$\hat{x}_0$$

(for a level of severity set to 0) and $x_t$ (for a level of severity set to "t"). For example, in some embodiments, that interpolation may be expressed as the following:

$$x_s = D_{\hat{x}_T^{(t)}}(\hat{x}_0, s) = \sqrt{\alpha_s}\,\hat{x}_0 + \sqrt{1-\alpha_s}\,\hat{x}_T^{(t)} \quad (3)$$

where $$\hat{x}_T^{(t)}$$

is an auxiliary degraded "input" audio signal as in degraded with the maximum level of degradation available "T" (based on some preset definition) that may be defined as $$\hat{x}_T^{(t)} = \frac{1}{\sqrt{1-\alpha_t}}\left(x_t - \sqrt{\alpha_t}\,\hat{x}_0\right)$$

so that we may have $$D_{\hat{x}_T^{(t)}}(\hat{x}_0, t) = x_t$$

(meaning $x_t$ for a level of severity set to "t"). Then in equation (3) describing $$D_{\hat{x}_T^{(t)}}(\hat{x}_0, t),$$

we may replace $x_t$ in place of $$\hat{x}_T^{(t)}$$

to obtain the following equation:

$$D_{\hat{x}_T^{(t)}}(\hat{x}_0, s) = \sqrt{\alpha_s}\,\hat{x}_0 + \frac{\sqrt{1-\alpha_s}}{\sqrt{1-\alpha_t}}\left(x_t - \sqrt{\alpha_t}\,\hat{x}_0\right) \quad (4)$$

While it might be counterintuitive at first that the implied degraded "input" audio signal shifts during the sampling process, it may be understood as an expedient intermediary mathematical quantity from a perspective of a local approximation of the ambiguously defined $$D(\hat{x}_0, t)$$

and $$(\hat{x}_0, t-1)$$

rather than to be interpreted literally as the initial input audio signal being changed. The calculation of $x_{t-1}$, i.e., each of the subsequent degraded target signal estimate of the recursive restoration 102B may be described as:

$$x_{t-1} \leftarrow \sqrt{\alpha_{t-1}}\,\hat{x}_0 + \frac{\sqrt{1-\alpha_{t-1}}}{\sqrt{1-\alpha_t}}\left(x_t - \sqrt{\alpha_t}\,\hat{x}_0\right) \quad (5)$$

The equation 5 depicts the output of the degradation operator 106 as per the proposed present disclosure.

Similarly, at step 514, the second degraded target signal estimate may be fed to the restoration operator 104 to obtain the subsequent target signal estimate. For example, an (N-1)th target signal estimate may be obtained from the restoration operator 104 at (N-2)th iteration.

At step 516, as the termination condition 104A is not yet met, the (N-1)th target signal estimate may be provided to the degradation operator 106. The degradation operator 106 may output the (N-1)th degraded target signal estimate that may be provided again to the restoration operator 104. At step 518, a Nth target signal estimate may be obtained from the restoration operator 104. In an exemplary scenario, the Nth iteration may be the last iteration. In such a case, the termination condition 104A is met and at step 520, the Nth target signal estimate may be provided as the output of the audio processing system 102.

Figure 6A:
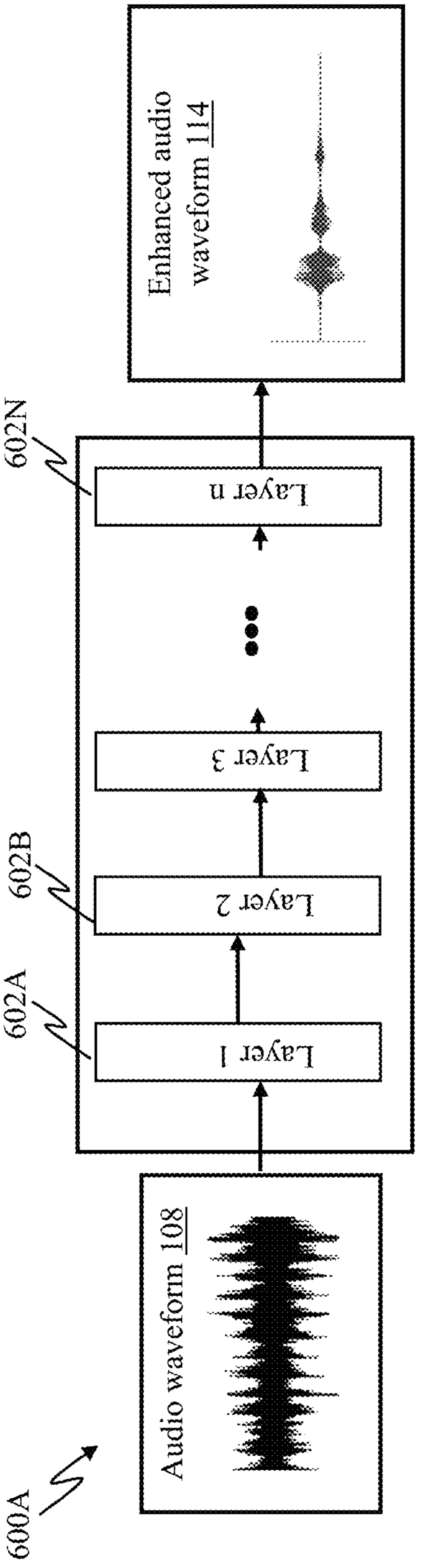
FIG. 6A is a schematic diagram depicting an exemplary architecture of a restoration operator, according to some embodiments of the present disclosure.
Figure 6B:
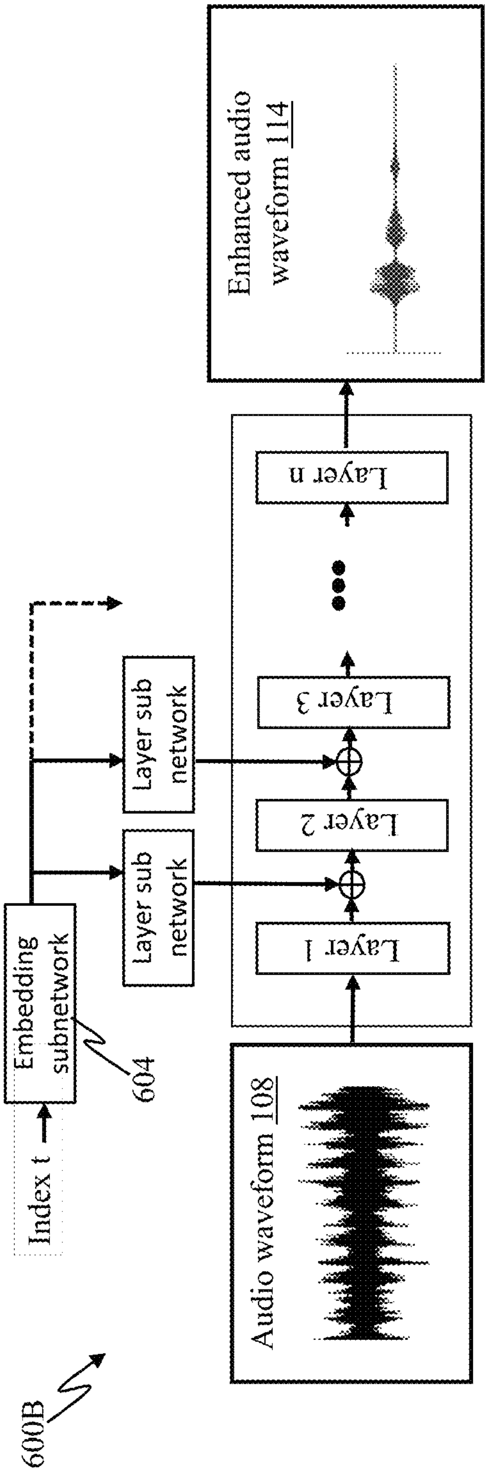
FIG. 6B is a schematic diagram depicting an exemplary architecture of the restoration operator, according to some other embodiments of the present disclosure.

Exemplary architectures of the restoration operator 104 are further described in FIG. 6A and FIG. 6B.

FIG. 6 is a schematic diagram 600 depicting an exemplary architecture of the restoration operator 104, according to some other embodiments of the present disclosure. The restoration operator 104 may be for example, the neural network model that may be trained with the help of machine learning. The restoration operator 104 may be trained to restore the input (degraded) audio signal as discussed in FIG. 5.

In some embodiments, the restoration operator 104 may be a convolution neural network comprising a feed forward and bidirectional convolution (Bi-DilConv) architecture. The Bi-DilConv architecture may be a non-autoregressive architecture that may synthesize high-dimensional audio waveforms in parallel. The convolution neural network may be composed of a stack of "N" residual layers, such as a layer 602A, a layer 602B and a layer 602N, with residual channels "C". Such residual layers may be grouped into "m" blocks and each block may have $$n = \frac{N}{m}$$

layers. In an embodiment, the dilation may be doubled at each layer within each block, i.e., $[1, 2, 4, \ldots, 2^{n-1}]$. The skip connections from all residual layers may be summed up as in a conventional network WaveNet®. In some embodiments, the restoration operator 104 may be similar to DiffWave® that may use a rectified linear unit (ReLU) activation function before the output. However, unlike the conventional DiffWave®, the proposed restoration operator 104 may directly estimate the clean or enhanced audio waveform 114 instead of estimating noise at each step. The last activation may be modified from the ReLU function to a Tanh function in the restoration operator 104, directly generating the output waveform, such as the enhanced audio waveform 114. Additionally, in the proposed architecture of the DiffWave® the diffusion-step embedding layer 604 may be inserted, by inserting into all the encoder and decoder blocks, providing the DiffWave® with information of the diffusion (also known as degradation) step "t". The diffusion-step embedding layer may utilize a sinusoidal positional embedding sublayer followed by a fully connected linear sublayer, a Sigmoid Linear Unit (SiLU) elementwise operation, another fully connected linear sublayer and another SiLU elementwise operation.

In some other embodiments of the present disclosure, the restoration operator 104 may be a deep complex convolution recurrent network (DCCRN) with a diffusion-step embedding layer 604. The DCCRN may be a modified CRN with a complex CNN and complex batch normalization layers in an encoder and a decoder blocks of the DCCRN. Specifically, the complex module may model the correlation between magnitude and phase with a simulation of complex multiplication. During training of the DCCRN, the DCCRN may estimate a complex ratio mask (CRM) and may be optimized by waveform approximation (WA) on the enhanced output signal. The complex encoder block may include complex two-dimensional (2D) convolution layers (Conv2d), complex batch normalization, and real-valued Parametric Rectified Linear Unit (PReLU) activation function. Moreover, the complex Conv2d may include four traditional Conv2d operations, controlling complex information flow throughout the encoder block. Additionally, in the proposed architecture of the DCCRN the diffusion-step embedding layer 604 may be inserted, by inserting into all the encoder and decoder blocks, providing the DCCRN with information of the diffusion (also known as degradation) step "t". The diffusion-step embedding layer may utilize a sinusoidal positional embedding sublayer followed by a fully connected linear sublayer, a Gaussian Error Linear Units (GELU) elementwise operation and another fully connected linear sublayer.

Figure 7:
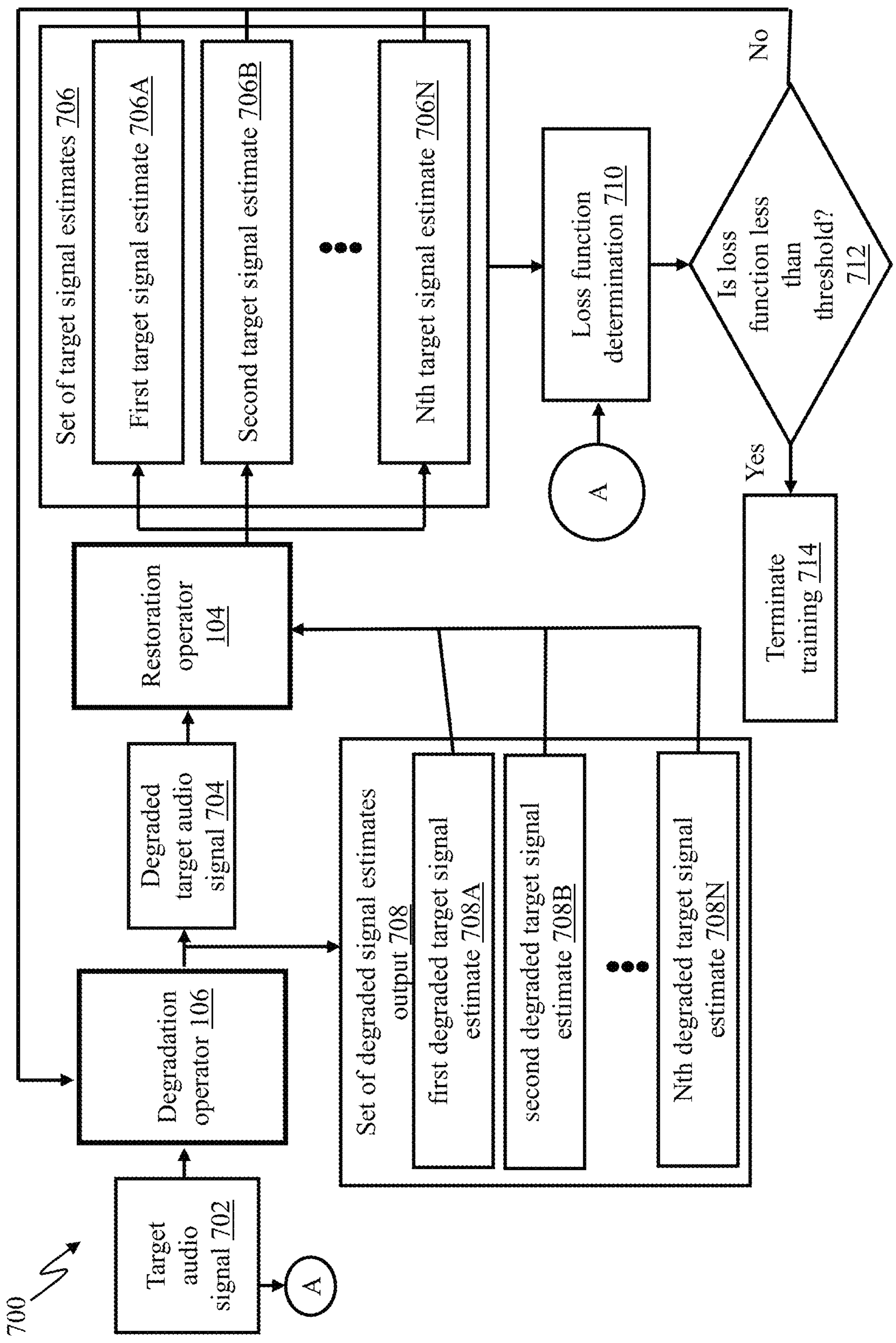
FIG. 7 is a flowchart of a method depicting training of the restoration operator, according to some embodiments of the present disclosure.

FIG. 7 is a flowchart of a method 700 depicting training of the restoration operator 104, according to some embodiments of the present disclosure. In various embodiments, the audio processing system 102 may perform one or more portions of the method 700 and may be implemented in, for instance, a chip set including the processor 202 and the memory 204 as shown in FIG. 2. As such, the audio processing system 102 may provide means for accomplishing various parts of the method 700, as well as means for accomplishing embodiments of other processes described herein. Although the method 700 is illustrated and described as a sequence of steps, it is contemplated that various embodiments of the method 700 may be performed in any order or combination and need not include all of the illustrated steps.

The proposed restoration operator 104 that is the neural network model, may be trained in a similar manner to the conventional cold diffusion model is trained.

A training process for standard speech enhancement is described in following algorithm 1:

| Algorithm 1: Typical speech enhancement training algorithm | |
|---|---|
| for each training iteration do | |
| a. | Select a clean target speech signal $x_0$ |
| b. | Select an interference audio signal n |
| c. | Make a degraded input audio signal $x_T \leftarrow x_0 + n$ |
| d. | Compute neural network response $\hat{x}_\theta = R_\theta(x_T)$ |
| e. | Take gradient descent step on $R_\theta$ based on gradient $\nabla_\theta \text{loss}\ (x_0, \hat{x}_0)$ |
| end | |

In algorithm 1, the network may only get to see degradations resulting from the forward diffusion process and attempts to compensate for those, but it may not be able to compensate for errors in its attempt at restoring the clean speech input (i.e., the clean target signal).

Concurrently, an example of a training for standard cold diffusion that is used for animorphosis (straightforwardly replacing a target animal picture y by the interference audio example y) is shown in algorithm 2;

| Algorithm 2: A cold diffusion training algorithm for animorphosis | |
|---|---|
| for each training iteration do | |
| a. | Select a clean speech target audio signal $x_0$ |
| b. | Select a interference audio signal y |
| c. | Sample an index t uniformly between 1 and T |
| d. | Make a degraded audio signal $x_t \leftarrow \sqrt{\alpha_t}x_0 + \sqrt{1-\alpha_t}y$ |
| e. | Compute neural network response $\hat{x}_0 = R_\theta(x_T, T)$ |
| f. | Take gradient descent step on $R_\theta$ using gradient $\nabla_\theta \text{loss}\ (x_0, \hat{x}_0)$ |
| end | |

However, to properly perform speech enhancement using a cold-diffusion-like approach, one or more training algorithms may be used thereafter.

An algorithm 3 enables for the enhancement of the audio waveform 108 that may combine the aspects of algorithm 1 and algorithm 2. Algorithm 3 is as follows:

| Algorithm 3: A proposed cold diffusion training algorithm for speech enhancement | |
|---|---|
| for each training iteration do | |
| a. | Select a clean speech target audio signal $x_0$ |
| b. | Select a interference audio signal n |
| c. | Make a degraded audio signal $x_T \leftarrow x_0 + n$ |
| d. | Sample an index t uniformly between 1 and T |
| e. | Make a "partially" degraded audio signal $x_t \leftarrow \sqrt{\alpha_t}x_0 + \sqrt{1-\alpha_t}x_T$ |
| f. | Compute neural network response $\hat{x}_0 = R_\theta(x_t, t)$ |
| g. | Take gradient descent step on $R_\theta$ using gradient $\nabla_\theta \text{loss}\ (x_0, \hat{x}_0)$ |
| end | |

However, the cold diffusion frameworks shown in algorithms 2 and 3 may have limitations. As seen in both algorithms, the network may only get to see degradations resulting from the forward diffusion process and attempts to compensate for those, but it may not be able to compensate for errors in its attempt at restoring the clean speech signal (i.e., clean target signal) which may require applying the forward and backward diffusion process multiple times. On the other hand, we may consider one or more algorithms proposed thereafter to overcome the limitations of the prior training algorithms.

An algorithm 4 is further proposed as an unfolded training algorithm. The unfolded training redegrade (re-add interference signals) to the cleaned output (i.e., the target signal estimate) of the restoration operator 104. That redegraded target signal estimate may be processed by the restoration operator 104 again to generate a second target signal estimate. The gradient descent is then applied such that the restoration operator 104 should minimize differences between both target signal estimates and the true clean or a ground truth target signal. Algorithm 4 is as follows:

Algorithm 4: A proposed unfolded training algorithm for speech enhancement for each training iteration do
a. Select a clean speech target audio signal $x_0$
b. Select a interference audio signal n
c. Make a degraded audio signal $x_T \leftarrow x_0 + n$
d. Sample an index t uniformly between 1 and T
e. Make a "partially" degraded audio signal $x_t \leftarrow \sqrt{\alpha_t}x_0 + \sqrt{1-\alpha_t}x_T$
f. Compute neural network response $\hat{x}_0 = R_\theta(x_t, t)$
g. Sample an index t' uniformly between 1 and t
h. Make a "partially" degraded audio signal $x_{t'} \leftarrow \sqrt{\alpha_{t'}}x_0 + \sqrt{1-\alpha_{t'}}x_T$
i. Compute neural network response $\widehat{\hat{x}_0} = R_\theta(x_{t'}, t')$
j. Take gradient descent step on $R_\theta$ using gradient $\nabla_\theta$loss $(x_0, \hat{x}_0)$ + loss $(x_0, \widehat{\hat{x}_0})$)
end An algorithm 5 is further proposed as an unfolded training algorithm with a modified degradation. In this case, generating the second "partially" degraded audio signal no longer relies on the "fully" degraded example $x_T$ but instead the first "partially" degraded audio signal $x_t$. Algorithm 5 is as follows:

Algorithm 5: A proposed unfolded training algorithm with modified degradation for each training iteration do
a. Select a clean speech target audio signal $x_0$
b. Select a interference audio signal n
c. Make a degraded audio signal $x_T \leftarrow x_0 + n$
d. Sample an index t uniformly between 1 and T
e. Make a "partially" degraded audio signal $x_t \leftarrow \sqrt{\alpha_t}\,x_0 + \sqrt{1-\alpha_t}\,x_t$
f. Compute neural network response $\hat{x}_0 = R_\theta(x_t, t)$
g. Sample an index t' uniformly between 1 and t
h. Make a "partially" degraded audio signal $$x_{tt'} \leftarrow \sqrt{a_{t'}}\,x_0 + \frac{\sqrt{1-\alpha_{t'}}}{\sqrt{1-\alpha_t}}\left(x_t - \sqrt{\alpha_t}\,\hat{x}_0\right)$$

i. Compute neural network response $\widehat{\hat{x}_0} = R_\theta(x_{t'}, t')$
j. Take gradient descent step on $\nabla_\theta$ (loss $(x_0, \hat{x}_0)$ + loss $(x_0, \widehat{\hat{x}_0})$)
end The degradation may be defined as the interpolation between 2 known signals. At the beginning of the algorithm 5, the two known signals are assumed to be $x_0$ and $x_T$. If the intermediary signals $$\hat{x}_0$$

and $x_t$ have been estimated, the next two known signals may need to be decided to use for the next degradation calculation. The conventional algorithms suggest using $$\hat{x}_0$$

and $x_T$ as in the Algorithm 4, however the Algorithm 5 uses $$\hat{x}_0$$

and x t . Briefly, the rationale is that since $$\hat{x}_0 \neq x_0,$$

using $x_t$ is more advantageous than using $x_T$. The steps for the training of the restoration operator 104 are explained as follows:

At step 702, in some embodiments, for an iteration of training, a first (clean) target audio signal is provided as an input to the degradation operator 106. In an embodiment, the first target audio signal may be a known signal deemed clean that may be used as the ground truth data in the training. At step 704, a degraded target audio signal may be obtained. For example, the degradation operator 106 may degrade the input clean audio signal to output the degraded target audio signal. The degraded target audio signal may further be input to the restoration operator 104.

At sub step 706A of a step 706, a first target audio estimate may be obtained from the restoration operator 104. The first target audio estimate 706A may again be provided to the degradation operator 106.

At sub step 708A of a step 708, a first degraded target audio estimate may be subsequently received from the degradation operator 106 processing the first target audio estimate 706A. Thus, instead of relying on a single round of restoration, the target audio estimate (such as the first target audio estimate 706A)

$$\hat{x}_0$$

from the last step may be provided to the degradation operator 106 and degradation may be performed with a smaller severity, i.e., t'≤t. The first degraded target audio estimate $$x_t'$$

708A may be obtained that may further be enhanced by providing to the restoration operator 104. The restoration operator 104 may output the second target signal estimate 706B (such as *– 1][qPi] + cQpPicOffset (8-1133)* ).

Similarly, at the step 706, the set of degraded signal estimates comprising at least the first degraded target signal estimate may be iteratively provided (such as at sub step 706B and sub step 706N) to the restoration operator 104. Each degraded signal estimate of the set of subsequent degraded signal estimates is degraded using the degradation operator with the different decreasing levels of severity. The set of target signal estimates may be iteratively received based on processing of the set of degraded signal estimates.

Furthermore, at the step 708, the set of degraded signal estimates may be output from the degradation operator 106. For example, at sub step 708B and sub step 708N, the inputs may be received from the restoration operator 104 that may be degraded by the degradation operator 106 to output the set of degraded signal estimates.

At step 710, the loss function may be determined. In some embodiments, the loss function may be based on calculation of a difference between the target audio signal taken as the ground truth signal and a current target signal estimate of the set of target signal estimates. For example, the loss function may be calculated between a target signal estimate output at step 706 and the target audio signal received at step 702. In other embodiments, the loss function may be based on the calculation of a sum of differences between the target audio signal taken as ground truth signal and each target signal estimate from a set of target signal estimates. For example, the loss function may be calculated as a sum of the differences between each target signal estimate of the set of target signal estimates at step 706 and the target audio signal received at step 702.

In some embodiments, the set of target signal estimates 706 produced through method 700 may consist of a first target signal estimate $\hat{x}_0$ 706A and a second target signal estimate $\widehat{\hat{x}_0}$ 706B. The difference between the target audio signal $x_0$ 702 and each target signal estimate may be calculated with the L1 distance. Thus, the loss function may be described as follows in equation 6:

$$L(\theta) = \|\hat{x}_0 - x_0\|_1 + \|\widehat{\hat{x}_0} - x_0\|_1 = \|R_\theta(D(x_0, t), t) - x_0\|_1 + \|R_\theta(D(\hat{x}_0, t') - x_0\|_1 \quad (6)$$

Following the determination of a loss function, a gradient of the loss with respect to some set of current parameters may be determined. This set of current parameters may be the current restoration operator parameters θ. Based on the gradient of the loss with respect to some set of current parameters, this set of current parameters may be processed based on an optimization algorithm. The optimization algorithm may output a set of updated parameters. In some embodiments, the optimization algorithm may be a stochastic gradient algorithm. In further embodiments, the stochastic gradient algorithm may be an Adam gradient descent algorithm.

At step 712, the loss function may be determined to be less than or equal to a threshold. In case the loss function is more than the threshold, we may then run method 700 again. To do so, we may use a (different) new target audio signal 706. We may use a restoration operator following a set of parameters θ that is updated by a set of updated parameters following the computation of an optimization algorithm based on a gradient of a loss with respect to the set of current parameters. At step 714 in case the loss function is less than or equal to the threshold, the training may be terminated.

Moreover, in some embodiments, for the training, a standard dataset such as a VoiceBank-DEMAND® dataset may be used. The VoiceBank-DEMAND® dataset may include data from 30 speakers and 20 types of interference signals. The isolated audio data from the speakers may be used to get a target audio signal 702. Background audio signal examples may be generated by summing a target audio signal 702 with an interference audio signal extracted from the audio data of the different types of interference audio signals. In an example, we may use one of four signal-to-noise ratio (SNRs) to mix clean speech signals with interference audio signals in the dataset, for example, [0, 5, 10, 15] dB for to form a degraded mixture audio signal, i.e., degraded target audio signal 704 for a round of a training method 700 of the restoration operator 104. We may pick from a different set of four SNRs [2.5, 7.5, 12.5, 17.5] dB for testing the performance of a partially or fully trained restoration operator 104.

Furthermore, in some embodiments, a set integer number of available degradation steps T for a degradation operator 106 may be, for example, 50 to 200. For a given level of degradation, the interpolation weight (such as the interpolation parameter) $a_t$ may be defined as a cosine schedule both for the training and the inference as described in equation 7:

$$\alpha_t = \frac{f(t)}{f(0)}, \quad f(t) = \cos^2\left(\frac{t/T + s}{1 + s} \cdot \frac{\pi}{2}\right), \quad s = 0.008 \quad (7)$$

Thus, the deterministic degradation of the current target signal estimate may be performed by using the value of the weighted interpolation determined using equation 7.

Figure 8:
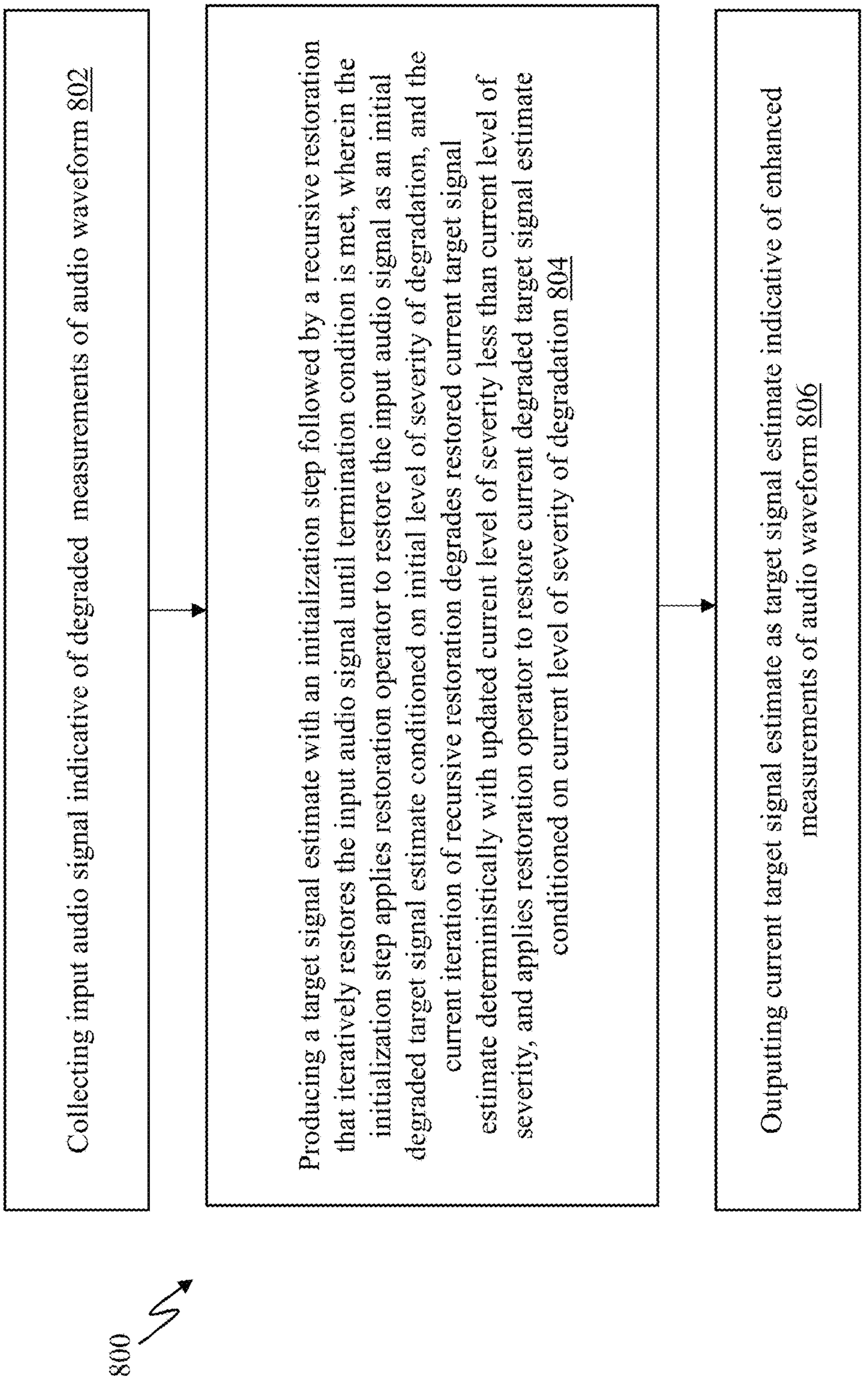
FIG. 8 is a flowchart of a method depicting enhancement of the audio signals, according to some embodiments of the present disclosure.

FIG. 8 is a flowchart of a method 800 depicting enhancement of the audio signals, according to some other embodiments of the present disclosure. In various embodiments, the audio processing system 102 may perform one or more portions of the method 800 and may be implemented in, for instance, a chip set including the processor 202 and the memory 204 as shown in FIG. 2. As such, the audio processing system 102 may provide means for accomplishing various parts of the method 800, as well as means for accomplishing embodiments of other processes described herein. Although the method 800 is illustrated and described as a sequence of steps, it is contemplated that various embodiments of the method 800 may be performed in any order or combination and need not include all of the illustrated steps.

At step 802, the input audio signal 110 indicative of the degraded measurements of the audio waveform 108 may be collected. For example, the audio processing system 102 may communicate with an electronic device such as the smartphone to receive the audio waveform 108. The audio processing system 102 may collect the input audio signal 110 of the audio waveform 108. Details of collection of the input audio signal 110 are further provided, for example, in FIG. 4.

In some embodiments, the input audio signal 110 may be preprocessed. Details of processing of the input audio signal 110 are further provided, for example, in FIG. 4.

At step 804, the input audio signal 110 may be enhanced with the recursive restoration operation 102B that may recursively restore the input audio signal until the termination condition 104A is met. Thus, at step 804, the input signal 110 is processed using an initialization step followed by recursive restoration. The initialization step 102A and the recursive restoration operation 102B are explained in previous embodiments. For example, in the current iteration of the recursive restoration operation 102B, the restoration operator 104 may be configured to restore the current target signal estimate conditioned on a current level of severity of degradation. The degradation operator 106 may be configured to degrade the current target signal estimate (such as the target signal estimate 112) deterministically with a level of severity less than the current level of severity. Details of the recursive restoration operation 102B are further provided, for example, in FIG. 4 and FIG. 5.

At step 806, the target signal estimate 112 that may indicate enhanced measurements of the audio waveform 108 (such as the enhanced audio waveform 114) may be output. Details of the output of the enhanced audio waveform 114 are further provided, for example, in FIG. 4 and FIG. 5.

Figure 9:
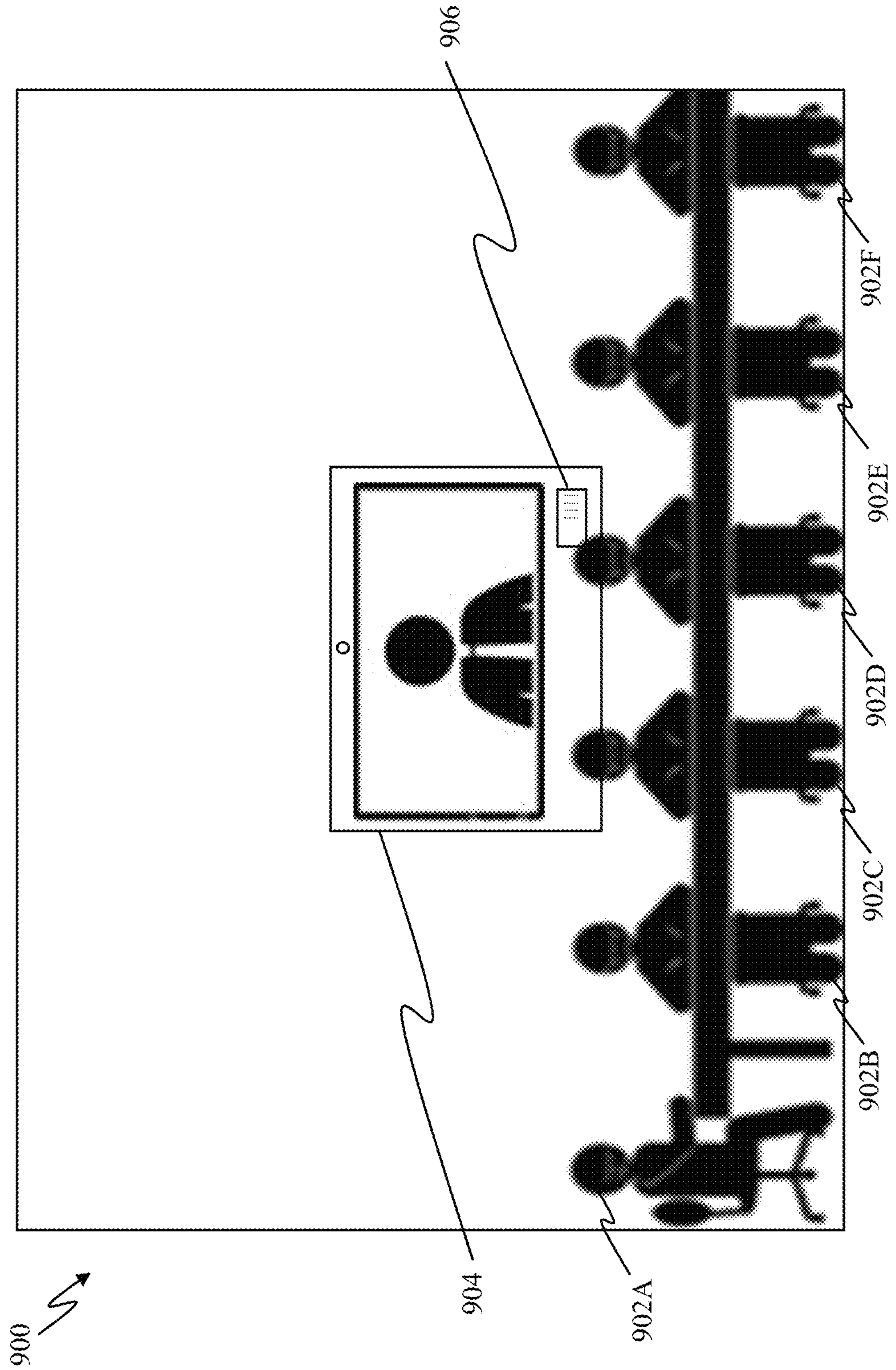
FIG. 9 illustrates a diagram of an exemplary use case for utilization of the audio processing system, according to embodiments of the present disclosure.

FIG. 9 shows a diagram 900 of an exemplary use case for utilization of the audio processing system 102, according to embodiments of the present disclosure. The diagram 900 may include a teleconferencing room that includes a group of speakers, such as a speaker 902A, a speaker 902B, a speaker 902C, a speaker 902D, a speaker 902E and a speaker 902F (group of speakers 902A-902F). The speech signals of one or more speakers of the group of speakers 902A-902F is received by an audio receiver 906 of an electronic device 904. The audio receiver 906 is equipped with the audio processing system 102 and receives acoustic speech signals of a speaker or one or more speakers from the group of speakers 902A-902F.

The audio receiver 906 may include a single microphone and/or an array of microphones for receiving a mixture of acoustic signals from the group of speakers 902A-902F as well as interference signals in the teleconferencing room. This mixture of acoustic signals from the group of speakers 902A-902F may be processed by using the audio processing system 102 for the speech enhancement. For instance, the audio processing system 102 may analyze the audio waveform associated with the acoustic signals of the teleconferencing room. The audio processing system 102 may output the enhanced audio waveform 114 by removing the interference signals from the acoustic signals of the teleconferencing room. The enhanced audio waveform 114 or the speech signals may be further used for transcription of utterances of the speakers. The transcription may be displayed via a display screen of the device 904.

Figure 10:
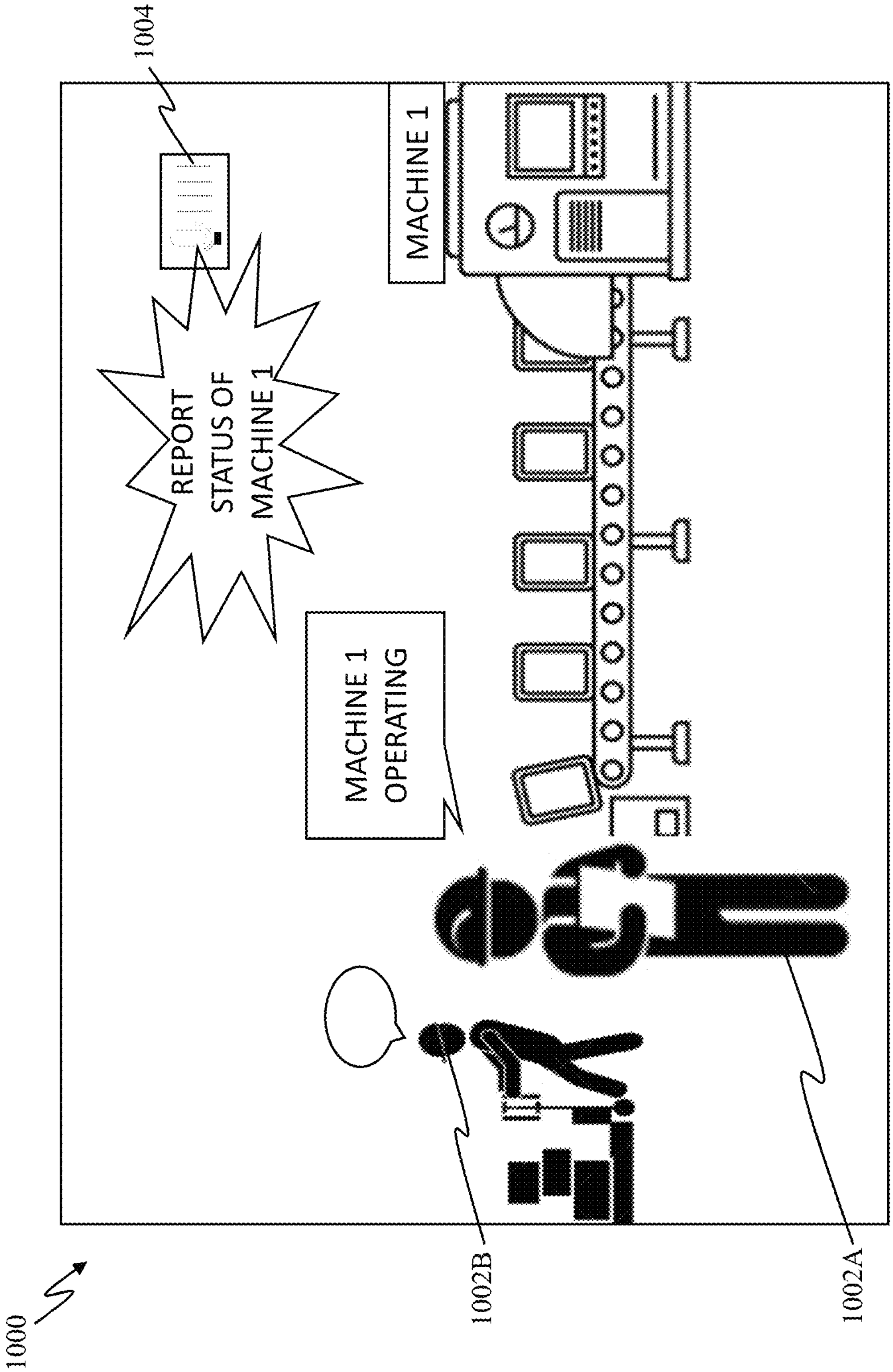
FIG. 10 illustrates a diagram of an exemplary use case for utilization of the audio processing system, according to embodiments of the present disclosure.

FIG. 10 shows a diagram 1000 of an exemplary use case for utilization of the audio processing system 102, according to embodiments of the present disclosure. The diagram 1000 may include a factory floor that includes one or more speakers, such as a speaker 1002A and a speaker 1002B. The factory floor may have high noises due to operations of different industrial machineries. The factory floor may also be equipped with an audio device 1004 for facilitating communication between a control operator of the factory floor (not shown) with the one or more speakers 1002A and 1002B on the factory floor. The audio device 1004 may be equipped with the audio processing system 102.

In an illustrative example scenario, the audio device 1004 may be sending an audio command that may be addressed to the person 1002A managing the factory floor. The audio command may include "REPORT STATUS OF MACHINE 1". The speaker 1002A may utter "MACHINE 1 OPERATING". However, speech signals of the utterances of the speaker 1002A may be mixed with noises from the machine, noises from background and other utterances from the speaker 1002B in the background.

Such background signals may be mitigated by the audio processing system 102. In some embodiments, the audio processing system 102 may be utilized for automatic speech recognition. The audio processing system 102 outputs a clean speech of the speaker 1002A. The audio processing system 102 may recognize the speech of the speaker 1002A to provide to the control operator of the factory floor. The clean speech is inputted to the audio device 1004. The audio device 1004 receives the clean speech and captures a response for the audio command from the clean speech corresponding to the utterance of the speaker 1002A. The audio processing system 102 enables the audio device in achieving an enhanced communication with intended speaker, such as the speaker 1002A.

Figure 11:
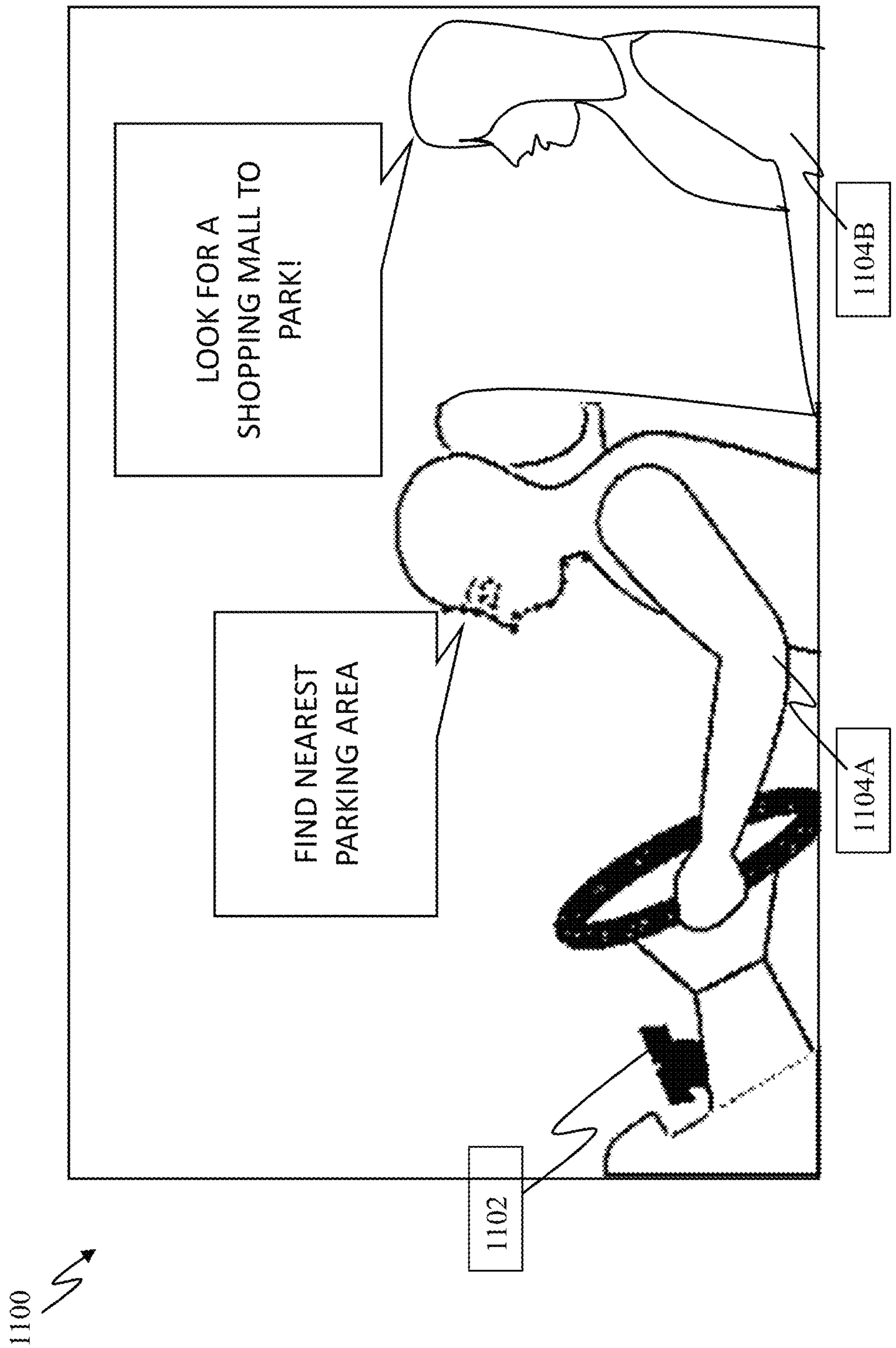
FIG. 11 illustrates a diagram of an exemplary use case for utilization of the audio processing system, according to embodiments of the present disclosure.

FIG. 11 shows a diagram 1110 of an exemplary use case for utilization of the audio processing system 102, according to embodiments of the present disclosure. The diagram 1110 may include a driver assistance system 1102. The driver assistance system 1102 may be implemented in a vehicle, such as a manually operated vehicle, an automated vehicle, or a semi-automated vehicle. The vehicle is occupied by one or more persons, such as a person 1104A and a person 1104B. The driver assistance system 1102 is equipped with the audio processing system 102. For instance, the driver assistance system 1102 may be remotely connected to the audio processing system 102 via a network. In some alternative example embodiments, the audio processing system 102 may be embedded within the driver assistance system 1102.

The driver assistance system 1102 may also include a microphone or multiple microphones to receive a mixture of acoustic signals. The mixture of acoustic signals may include speech signals from the persons 1104A and 1104B as well as external background signals, such as honking sound of other vehicles, etc. In some cases, when the person 1104A is sending a speech command to the driver assistance system 1102, the other person 1104B may utter louder than the person 1104A. The utterance from the person 1104B may intervene with the speech command of the person 1104A. For instance, the speech command of the person 1104A may be "FIND THE NEAREST PARKING AREA" and the utterance of the person 1104B may be "LOOK FOR A SHOPPING MALL TO PARK". In such instance, the audio processing system 102 processes the utterances of each of the person 1104A and the person 1104B, simultaneously or separately. The audio processing system 102 separates the utterances of the person 1104A and the person 1104B. The separated utterances are used the driver assistant system 1102. The driver assistant system 1102 may process and execute the speech command of the person 1104A and the utterance of the person 1104B and accordingly output response for each of the utterances based on automatic recognition of the speeches.

In some embodiments, the driver assistance system 1102 may be utilized by the person 1104A and the person 1104B for sound event detection. For example, the audio signals associated with approaching vehicles may be received. In case any approaching vehicle is close to the vehicle of the person 1104A and the person 1104B, warnings may be provided by the driver assistance system 1102. The audio signals associated with approaching vehicles may be considered as one event by the driver assistance system 1102 to provide the warnings.

Figure 12:
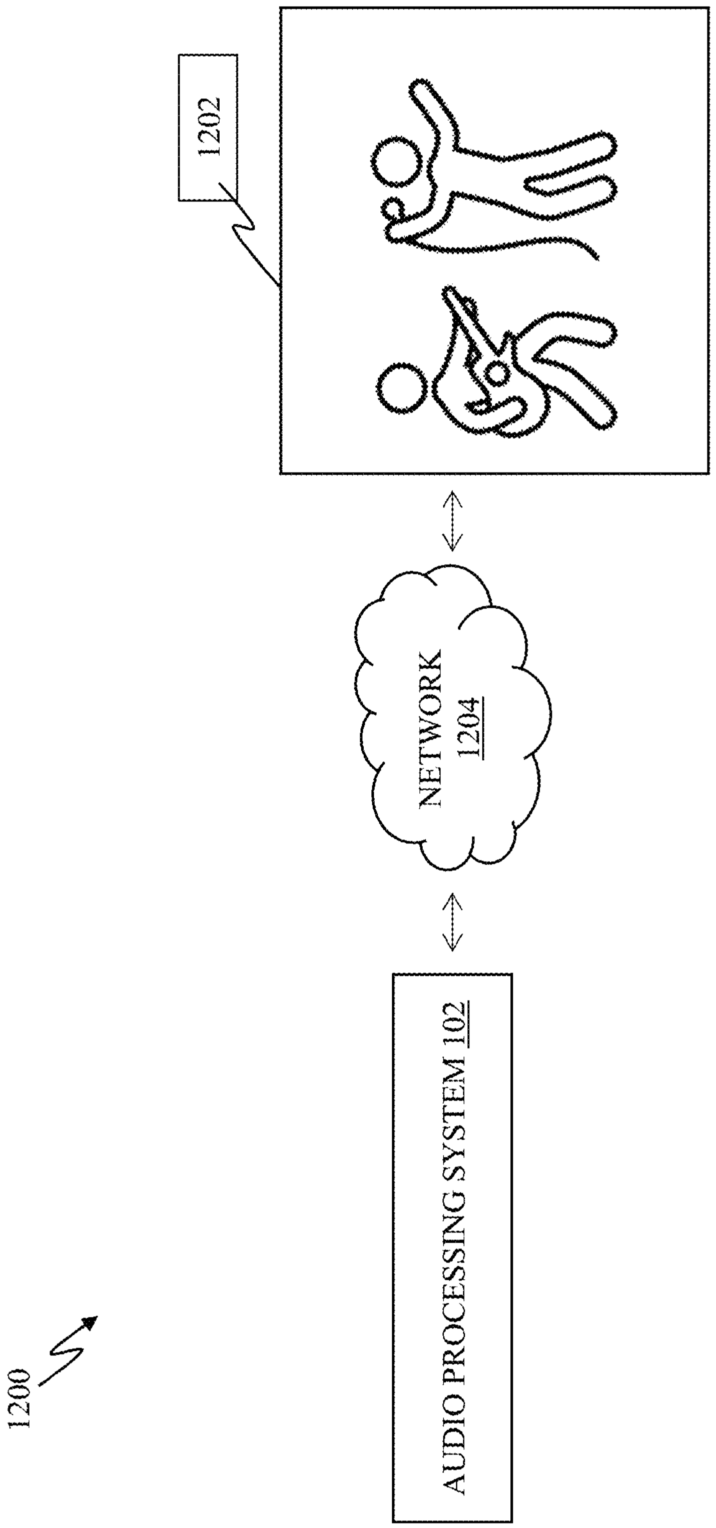
FIG. 12 illustrates a diagram of an exemplary use case for utilization of the audio processing system, according to embodiments of the present disclosure.

FIG. 12 shows a diagram 1200 of an exemplary use case for utilization of the audio processing system 102, according to embodiments of the present disclosure. The diagram 1200 may include a music concert hall 1202 and a network 1204. In some example embodiments, the audio processing system 102 may process the audio waveform by artists performing in the music concert hall 1202 to determine the enhanced audio waveform 114. The audio waveform by artists accessed via the input devices such as microphones using the network 1204. There may be echo and noise associated with the received audio waveform. The audio processing system 102 may remove the echo and noise associated with the received audio waveform and provide the enhanced audio waveform 114 for listeners.

Figure 13:
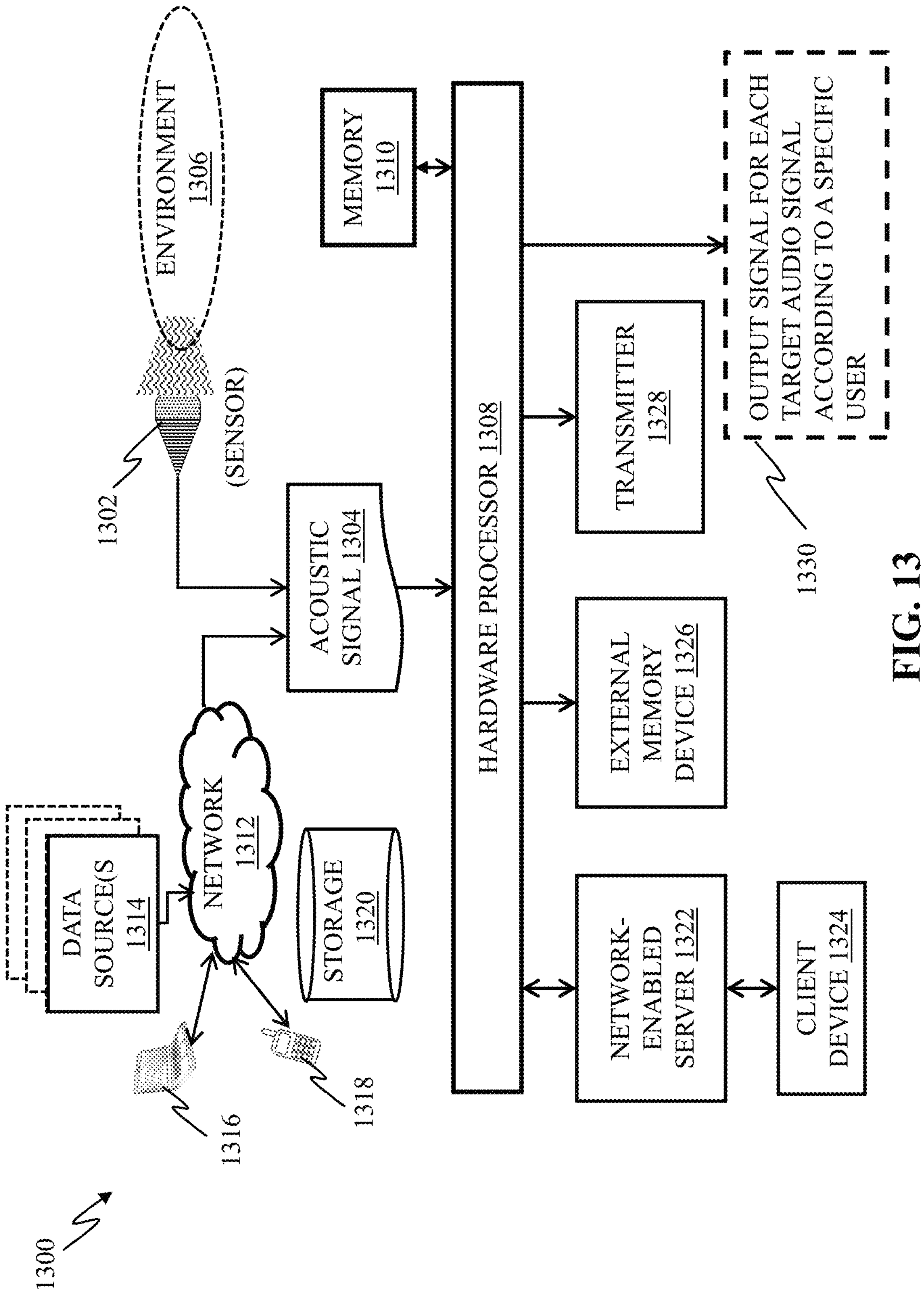
FIG. 13 is a detailed block diagram of the audio processing system, according to embodiments of the present disclosure.

FIG. 13 is a detailed block diagram 1300 of the audio processing system 102, according to embodiments of the present disclosure. In some example embodiments, the audio processing system 102 includes a sensor 1302 or sensors, such as an acoustic sensor, which collects data including an acoustic signal(s) 1204 from an environment 1306. The acoustic signal 1304 may be associated with the audio waveform 108 including the interference audio measurements. For example, the acoustic signal 1304 may include multiple speakers with overlapping speech and background noises. Further, the sensor 1302 may convert an acoustic input into the acoustic signal 1304.

The audio processing system 102 includes a hardware processor 1308 that is in communication with a computer storage memory, such as a memory 1310. The memory 1310 includes stored data, including algorithms, instructions and other data that may be implemented by the hardware processor 1308. It is contemplated that the hardware processor 1308 may include two or more hardware processors depending upon the requirements of the specific application. The two or more hardware processors may be either internal or external. The audio processing system 102 may be incorporated with other components including output interfaces and transceivers, among other devices.

In some alternative embodiments, the hardware processor 1308 may be connected to a network 1312, which is in communication with one or more data source(s) 1314, computer device 1316, a mobile phone device 1318 and a storage device 1320. The network 1312 may include, by non-limiting example, one or more local area networks (LANs) and/or wide area networks (WANs). The network 1312 may also include enterprise-wide computer networks, intranets, and the Internet. The audio signal processing system 1300 may include one or more number of client devices, storage components, and data sources. Each of the one or more number of client devices, storage components, and data sources may comprise a single device or multiple devices cooperating in a distributed environment of the network 1312.

In some other alternative embodiments, the hardware processor 1308 may be connected to a network-enabled server 1322 connected to a client device 1324. The hardware processor 1308 may be connected to an external memory device 1326, and a transmitter 1328. Further, an output for each target speaker may be outputted according to a specific user intended use 1330. For example, the specific user intended use 1330 may correspond to displaying speech in text (such as speech commands) on one or more display devices, such as a monitor or screen, or inputting the text for each target speaker into a computer related device for further analysis, or the like.

The data source(s) 1314 may comprise data resources for training the restoration operator 104 for a speech enhancement task. For example, in an embodiment, the training data may include acoustic signals of multiple speakers talking simultaneously along with background noises. The training data may also include acoustic signals of single speakers talking alone, acoustic signals of single or multiple speakers talking in a noisy environment, and acoustic signals of noisy environments.

The data source(s) 1314 may also comprise data resources for training the restoration operator 104 for a speech recognition task. The data provided by data source(s) 1314 may include labeled and un-labeled data, such as transcribed and un-transcribed data. For example, in an embodiment, the data includes one or more sounds and may also include corresponding transcription information or labels that may be used for initializing the speech recognition task.

Further, un-labeled data in the data source(s) 1314 may be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or captured images (e.g., depth camera images), tweets, chat or video-call records, or social-networking media. Specific data source(s) 1314 used may be determined based on the application including whether the data is a certain class of data (e.g., data only related to specific types of sounds, including machine systems, entertainment systems, for example) or general (non-class-specific) in nature.

The audio processing system 102 may also include third party devices, which may comprise of any type of computing device, such as an automatic speech recognition (ASR) system on the computing device. For example, the third-party devices may include a computer device, or a mobile device 1318. The mobile device 1318 may include a personal data assistant (PDA), a smartphone, smart watch, smart glasses (or other wearable smart device), augmented reality headset, virtual reality headset, a laptop, a tablet, a remote control, an entertainment system, a vehicle computer system, an embedded system controller, an appliance, a home computer system, a security system, a consumer electronic device, or other similar electronics device. The mobile device 1318 may also include a microphone or line-in for receiving audio information, a camera for receiving video or image information, or a communication component (e.g., Wi-Fi functionality) for receiving such information from another source, such as the Internet or a data source 1314. In one example embodiment, the mobile device 1318 may be capable of receiving input data such as audio and image information. For instance, the input data may include a query of a speaker into a microphone of the mobile device 1318 while multiple speakers in a room are talking. The input data may be processed by the ASR in the mobile device 1318 using the system 200 to determine the content of the query. The audio processing system 102 may enhance the input data by reducing the interfering sounds coining from the environment of the speaker, separating the speaker from other speakers, or enhancing audio signals of the query and enable the ASR to output an accurate response to the query.

In some example embodiments, the storage 1320 may store information including data, computer instructions (e.g., software program instructions, routines, or services), and/or data related to the neural network model of the audio processing system 102. For example, the storage 1320 may store data from one or more data source(s) 1314, one or more deep neural network models, information for generating and training deep neural network models, and the computer-usable information outputted by one or more deep neural network models.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An audio processing system, comprising: at least one processor; and a memory having instructions stored thereon that, when executed by the at least one processor, cause the audio processing system to:

collect an input audio signal indicative of a mixture audio waveform, wherein the mixture audio waveform includes a target signal component and an interference signal component;

generate an enhanced target signal, estimated by executing a recursive restoration operation iteratively until a termination condition is met, wherein the recursive restoration operation is configured to receive, in an initialization step, an input audio mixture as an initial degraded target signal estimate with an initial level of severity of degradation, wherein the initialization step and the recursive restoration operation use a restoration operator configured to restore a degraded target signal estimate conditioned on a level of severity of degradation, wherein the initialization step applies the restoration operator to the initial degraded target signal estimate conditioned on the initial level of severity to obtain a current target signal estimate, and execute a current iteration of the recursive restoration operation, the current iteration comprising degrading the current target signal estimate deterministically with a current level of severity less than a previous level of severity and applying the restoration operator conditioned on the current level of severity to obtain an updated enhanced signal estimate; and output the updated enhanced signal estimate as a target signal estimate.

2. The audio processing system of claim 1, wherein the restoration operator is a neural network trained with machine learning to restore an input signal degraded from a clean target signal with different levels of severity.

3. The audio processing system of claim 1, wherein the current level of severity of the first iteration in the recursive restoration is less than the level of severity of the input audio mixture.

4. The audio processing system of claim 1, wherein the current level of severity is monotonically related to an index of the current iteration in the recursive restoration.

5. The audio processing system of claim 4, wherein the index of the current iteration in the recursive restoration decreases over time with each iteration, starting from an initial value of the index down to zero.

6. The audio processing system of claim 1, wherein the deterministic degradation of the current target signal estimate uses a weighted interpolation of any combination of two or more out of the current and previous current target signal estimates, and current and previous current degraded target signal estimates, generated in the initialization step and the recursive restoration.

7. The audio processing system of claim 1, wherein the deterministic degradation of the current target signal estimate uses a weighted interpolation of the current target signal estimate and a current degraded target signal estimate with a weight determined based on a function of the index of the current iteration of the recursive restoration operation.

8. The audio processing system of claim 1, wherein the termination condition is based on a determination comprising one or a combination of determining: that a difference between the current target signal estimate and an enhanced signal estimate, or a difference between the input audio signal and the current target signal estimate is less than or equal to a threshold.

9. The audio processing system of claim 1, wherein the termination condition is based on a number of iterations of the recursive restoration operation.

10. The audio processing system of claim 1, wherein the recursive restoration operation further applies a degradation operator on the current target signal estimate to degrade the current target signal estimate deterministically.

11. The audio processing system of claim 1, wherein the restoration operator is a convolution neural network comprising a feed forward and bidirectional convolution architecture, and a diffusion step embedding layer.

12. The audio processing system of claim 1, wherein the restoration operator is a deep complex convolution recurrent network with a diffusion-step embedding layer.

13. The audio processing system of claim 1, wherein the at least one processor causes the audio processing system to utilize the target signal estimate for speech enhancement.

14. The audio processing system of claim 1, wherein the at least one processor causes the audio processing system to utilize the target signal estimate for automatic speech recognition.

15. The audio processing system of claim 1, wherein the at least one processor causes the audio processing system to utilize the target signal estimate for sound event detection.

16. The audio processing system of claim 1, wherein training of the restoration operator comprises:

providing, as an input, a target audio signal to the degradation operator to obtain a first degraded target audio signal;

providing, as an input, the first degraded target audio signal, to the restoration operator; and receiving, as an output from the restoration operator, a first target signal estimate from the restoration operator.

17. The audio processing system of claim 16, wherein the training of the restoration operator further comprises:

iteratively providing, as the input to the restoration operator, a set of degraded signal estimates comprising at least a first degraded target signal estimate, wherein each degraded target signal estimate of the set of subsequent degraded target signal estimates is degraded using the degradation operator with different levels of severity; and iteratively receiving, as the output of the restoration operator, a set of target signal estimates, based on processing of the set of degraded target signal estimates.

18. The audio processing system of claim 17, wherein the at least one processor further causes the audio processing system to:

determine a loss function based on calculation of a difference between the target audio signal taken as a ground truth signal and a subset of target signal estimates of the set of target signal estimates; and train the restoration operator until the determined loss function is less than or equal to a threshold value.

19. A method for audio processing, comprising: collecting an input audio signal indicative of a mixture audio waveform, wherein the mixture audio waveform includes a target signal component and a interference signal component;

generating an enhanced target signal, estimated by executing a recursive restoration operation iteratively until a termination condition is met, wherein the recursive restoration operation comprises:

receiving, in an initialization step, an input audio mixture as an initial degraded target signal estimate with an initial level of severity of degradation, wherein the initialization step and the recursive restoration use a restoration operator configured to restore a degraded target signal estimate conditioned on a level of severity of degradation, wherein the initialization step applies the restoration operator to the input audio mixture conditioned on the initial level of severity to obtain a current target signal estimate, and executing a current iteration of the recursive restoration operation, the current iteration comprising degrading a current enhanced signal estimate deterministically with a current level of severity less than a previous level of severity and applying the restoration operator conditioned on the current level of severity to obtain an updated enhanced signal estimate; and outputting the updated enhanced signal estimate as a target signal estimate.

20. The method of claim 19, wherein the restoration operator is a neural network trained with machine learning to restore an input signal degraded from a clean target signal with different levels of severity.

* * * * *